US010260905B2

(12) United States Patent
David et al.

(10) Patent No.: US 10,260,905 B2
(45) Date of Patent: Apr. 16, 2019

(54) ARRANGEMENTS FOR MAGNETIC FIELD SENSORS TO CANCEL OFFSET VARIATIONS

(71) Applicant: Allegro MicroSystems, LLC, Manchester, NH (US)

(72) Inventors: Paul A. David, Bow, NH (US); Eric G. Shoemaker, Windham, NH (US); Jeffrey Eagen, Manchester, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 54 days.

(21) Appl. No.: 15/176,655

(22) Filed: Jun. 8, 2016

(65) Prior Publication Data
US 2017/0356760 A1    Dec. 14, 2017

(51) Int. Cl.
*G01D 5/14*    (2006.01)
*G01D 5/16*    (2006.01)

(52) U.S. Cl.
CPC ............. *G01D 5/142* (2013.01); *G01D 5/147* (2013.01); *G01D 5/16* (2013.01)

(58) Field of Classification Search
CPC ...... G01R 33/07; G01R 33/077; G01R 33/09; G01R 33/072; G01R 33/02; G01R 33/10;
(Continued)

(56) References Cited

U.S. PATENT DOCUMENTS 3,195,043 A    7/1965    Burig et al.
3,281,628 A    10/1966    Bauer et al.
(Continued)

FOREIGN PATENT DOCUMENTS

CH    683 469 A5    3/1994
DE    25 18 054    11/1976
(Continued)

OTHER PUBLICATIONS

Office Action dated Aug. 26, 2016 for U.S. Appl. No. 13/946,380, 40 pages.
(Continued)

*Primary Examiner* — Lee E Rodak
(74) *Attorney, Agent, or Firm* — Daly, Crowley, Mofford & Durkee, LLP

(57) ABSTRACT

A magnetic field sensor can sense a movement of an object along a path. A movement line is tangent to the path. The magnetic field sensor can include a semiconductor substrate. The semiconductor substrate can have first and second orthogonal axes orthogonal to each other on the first surface of the substrate. A projection of the movement line onto a surface of the semiconductor substrate is only substantially parallel to the first orthogonal axis. The magnetic field sensor can also include first, second, third, and fourth magnetic field sensing elements disposed on the substrate. The first and second magnetic field sensing elements have maximum response axes parallel to the first orthogonal axis and the second and fourth magnetic field sensing elements have maximum response axes parallel to the second orthogonal axis. Signals generated by the second and fourth magnetic field sensing elements can be used as reference signals.

11 Claims, 17 Drawing Sheets

(58) Field of Classification Search
CPC ............ G01R 33/0029; G01R 33/0005; G01R 33/0017; G01R 33/0023; G01R 33/0041; G01R 33/0052; G01R 33/022; G01R 33/091; G01R 33/096; G01R 15/20; G01R 15/202; G01R 21/08; G01R 33/06; G01R 1/26; G01R 33/025; G01D 5/142; G01D 5/145; G01D 5/147; G01D 5/14; G01D 5/16; G01D 5/165; G01D 5/1655; G01D 5/2451; G01D 5/24476; G01D 5/2448; G01D 18/008; G01D 3/036; G01D 5/2046; G01D 5/244; G01D 5/2449; G01D 5/249; G01D 5/2515; G01D 5/2457; G01P 3/488; G01P 3/487; G01P 13/04; G01P 13/045; G01P 15/105; G01P 15/11; G01P 15/18; G01P 3/4802; G01P 3/4815; G01P 3/486; G01B 5/0011; G01B 9/02058; G01B 7/00; G01B 7/14; G01B 7/30; G01C 15/14; G01J 1/4228; G01N 2201/0438; G05B 2219/37392; G05B 2219/37124; G05B 2219/37133; G11B 2005/0016; G11B 2005/3996; Y10T 428/1107; G04C 5/00
USPC ............ 324/207.11, 207.24, 207.25, 207.26, 324/207.2, 207.21, 207.22, 3, 207.23
See application file for complete search history.

(56) References Cited

U.S. PATENT DOCUMENTS

| | | | |
|---|---|---|---|
| 3,607,528 | A | 9/1971 | Gassaway |
| 3,661,061 | A | 5/1972 | Tokarz |
| 3,728,786 | A | 4/1973 | Lucas et al. |
| 4,048,670 | A | 9/1977 | Eysermans |
| 4,079,360 | A | 3/1978 | Ookubo et al. |
| 4,188,605 | A | 2/1980 | Stout |
| 4,204,317 | A | 5/1980 | Winn |
| 4,236,832 | A | 12/1980 | Komatsu et al. |
| 4,283,643 | A | 8/1981 | Levin |
| 4,315,523 | A | 2/1982 | Mahawili et al. |
| 4,438,347 | A | 3/1984 | Gehring |
| 4,573,258 | A | 3/1986 | Io et al. |
| 4,614,111 | A | 9/1986 | Wolff |
| 4,649,796 | A | 3/1987 | Schmidt |
| 4,670,715 | A | 6/1987 | Fuzzell |
| 4,719,419 | A | 1/1988 | Dawley |
| 4,733,455 | A | 3/1988 | Nakamura et al. |
| 4,745,363 | A | 5/1988 | Carr et al. |
| 4,746,859 | A | 5/1988 | Malik |
| 4,752,733 | A | 6/1988 | Petr et al. |
| 4,758,943 | A | 7/1988 | Aström et al. |
| 4,760,285 | A | 7/1988 | Nelson |
| 4,769,344 | A | 9/1988 | Sakai et al. |
| 4,772,929 | A | 9/1988 | Manchester |
| 4,789,826 | A | 12/1988 | Willett |
| 4,796,354 | A | 1/1989 | Yokoyama et al. |
| 4,823,075 | A | 4/1989 | Alley |
| 4,833,406 | A | 5/1989 | Foster |
| 4,893,027 | A | 1/1990 | Kammerer et al. |
| 4,908,685 | A | 3/1990 | Shibasaki et al. |
| 4,910,861 | A | 3/1990 | Dohogne |
| 4,935,698 | A | 6/1990 | Kawaji et al. |
| 4,970,411 | A | 11/1990 | Halg et al. |
| 4,983,916 | A | 1/1991 | Iijima et al. |
| 5,012,322 | A | 4/1991 | Guillotte |
| 5,021,493 | A | 6/1991 | Sandstrom |
| 5,028,868 | A | 7/1991 | Murata et al. |
| 5,038,130 | A | 8/1991 | Eck et al. |
| 5,045,920 | A * | 9/1991 | Vig .......................... G01V 3/08 257/414 |
| 5,078,944 | A | 1/1992 | Yoshino |
| 5,084,289 | A | 1/1992 | Shin et al. |
| 5,121,289 | A | 6/1992 | Gagliardi |
| 5,137,677 | A | 8/1992 | Murata |
| 5,139,973 | A | 8/1992 | Nagy et al. |
| 5,167,896 | A | 12/1992 | Hirota et al. |
| 5,168,244 | A | 12/1992 | Muranaka |
| 5,185,919 | A | 2/1993 | Hickey |
| 5,196,794 | A | 3/1993 | Murata |
| 5,210,493 | A | 5/1993 | Schroeder et al. |
| 5,216,405 | A | 6/1993 | Schroeder et al. |
| 5,244,834 | A | 9/1993 | Suzuki et al. |
| 5,247,202 | A | 9/1993 | Popovic et al. |
| 5,247,278 | A | 9/1993 | Pant et al. |
| 5,250,925 | A | 10/1993 | Shinkle |
| 5,286,426 | A | 2/1994 | Rano, Jr. et al. |
| 5,289,344 | A | 2/1994 | Gagnon et al. |
| 5,304,926 | A | 4/1994 | Wu |
| 5,315,245 | A | 5/1994 | Schroeder et al. |
| 5,329,416 | A | 7/1994 | Ushiyama et al. |
| 5,331,478 | A | 7/1994 | Aranovsky |
| 5,332,956 | A | 7/1994 | Oh |
| 5,332,965 | A | 7/1994 | Wolf et al. |
| 5,341,097 | A | 8/1994 | Wu |
| 5,359,287 | A * | 10/1994 | Watanabe .............. G01D 5/147 324/174 |
| 5,412,255 | A | 5/1995 | Wallrafen |
| 5,414,355 | A | 5/1995 | Davidson et al. |
| 5,424,558 | A | 6/1995 | Borden et al. |
| 5,434,105 | A | 7/1995 | Liou |
| 5,453,727 | A | 9/1995 | Shibasaki et al. |
| 5,469,058 | A | 11/1995 | Dunnam |
| 5,477,143 | A | 12/1995 | Wu |
| 5,479,695 | A | 1/1996 | Grader et al. |
| 5,486,759 | A | 1/1996 | Seiler et al. |
| 5,488,294 | A | 1/1996 | Liddell et al. |
| 5,491,633 | A | 2/1996 | Henry et al. |
| 5,497,081 | A | 3/1996 | Wolf et al. |
| 5,500,589 | A | 3/1996 | Sumcad |
| 5,500,994 | A | 3/1996 | Itaya |
| 5,508,611 | A | 4/1996 | Schroeder et al. |
| 5,521,501 | A | 5/1996 | Dettmann et al. |
| 5,545,983 | A | 8/1996 | Okeya et al. |
| 5,551,146 | A | 9/1996 | Kawabata et al. |
| 5,581,170 | A | 12/1996 | Mammano et al. |
| 5,581,179 | A | 12/1996 | Engel et al. |
| 5,596,272 | A | 1/1997 | Busch |
| 5,621,319 | A | 4/1997 | Bilotti et al. |
| 5,627,315 | A | 5/1997 | Figi et al. |
| 5,631,557 | A | 5/1997 | Davidson |
| 5,640,090 | A | 6/1997 | Furuya et al. |
| 5,691,637 | A | 11/1997 | Oswald et al. |
| 5,696,790 | A | 12/1997 | Graham et al. |
| 5,712,562 | A | 1/1998 | Berg |
| 5,714,102 | A | 2/1998 | Highum et al. |
| 5,719,496 | A | 2/1998 | Wolf |
| 5,729,128 | A | 3/1998 | Bunyer et al. |
| 5,757,181 | A | 5/1998 | Wolf et al. |
| 5,781,005 | A | 7/1998 | Vig et al. |
| 5,789,658 | A | 8/1998 | Henn et al. |
| 5,789,915 | A | 8/1998 | Ingraham |
| 5,796,249 | A | 8/1998 | Andräet et al. |
| 5,818,222 | A | 10/1998 | Ramsden |
| 5,818,223 | A | 10/1998 | Wolf |
| 5,839,185 | A | 11/1998 | Smith et al. |
| 5,841,276 | A | 11/1998 | Makino et al. |
| 5,859,387 | A | 1/1999 | Gagnon |
| 5,883,567 | A | 3/1999 | Mullins, Jr. |
| 5,886,070 | A | 3/1999 | Honkura et al. |
| 5,912,556 | A | 6/1999 | Frazee et al. |
| 5,963,028 | A | 10/1999 | Engel et al. |
| 6,011,770 | A | 1/2000 | Tan |
| 6,016,055 | A | 1/2000 | Jager et al. |
| 6,043,646 | A | 3/2000 | Jansseune |
| 6,136,250 | A | 10/2000 | Brown |
| 6,169,396 | B1 | 1/2001 | Yokotani et al. |
| 6,175,233 | B1 | 1/2001 | McCurley et al. |
| 6,180,041 | B1 | 1/2001 | Takizawa |
| 6,184,679 | B1 | 2/2001 | Popovic et al. |
| 6,194,893 | B1 | 2/2001 | Yokotani et al. |
| 6,198,373 | B1 | 3/2001 | Ogawa et al. |

(56) References Cited

U.S. PATENT DOCUMENTS

| | | |
|---|---|---|
| 6,242,604 B1 | 6/2001 | Hudlicky et al. |
| 6,242,904 B1 | 6/2001 | Shirai et al. |
| 6,242,905 B1 | 6/2001 | Draxelmayr |
| 6,265,865 B1 | 7/2001 | Engel et al. |
| 6,278,269 B1 | 8/2001 | Vig et al. |
| 6,291,989 B1 | 9/2001 | Schroeder |
| 6,297,627 B1 | 10/2001 | Towne et al. |
| 6,297,628 B1 | 10/2001 | Bicking et al. |
| 6,323,642 B1 | 11/2001 | Nishimura et al. |
| 6,339,322 B1 | 1/2002 | Loreck et al. |
| 6,351,506 B1 | 2/2002 | Lewicki |
| 6,356,068 B1 | 3/2002 | Steiner et al. |
| 6,392,478 B1 | 5/2002 | Mulder et al. |
| 6,436,748 B1 | 8/2002 | Forbes et al. |
| 6,437,558 B2 | 8/2002 | Li et al. |
| 6,452,381 B1 | 9/2002 | Nakatani et al. |
| 6,492,804 B2 | 12/2002 | Tsuge et al. |
| 6,501,270 B1 | 12/2002 | Opie |
| 6,525,531 B2 | 2/2003 | Forrest et al. |
| 6,528,992 B2 | 3/2003 | Shinjo et al. |
| 6,542,847 B1 | 4/2003 | Lohberg et al. |
| 6,545,332 B2 | 4/2003 | Huang |
| 6,545,457 B2 | 4/2003 | Goto et al. |
| 6,545,462 B2 | 4/2003 | Schott et al. |
| 6,590,804 B1 | 7/2003 | Perner |
| 6,653,968 B1 | 11/2003 | Schneider |
| 6,674,679 B1 | 1/2004 | Perner et al. |
| 6,687,644 B1 | 2/2004 | Zinke et al. |
| 6,692,676 B1 | 2/2004 | Vig et al. |
| 6,768,301 B1 * | 7/2004 | Hohe ............ G01R 33/0094 324/225 |
| 6,770,163 B1 | 8/2004 | Kuah et al. |
| 6,781,233 B2 | 8/2004 | Zverev et al. |
| 6,781,359 B2 | 8/2004 | Stauth et al. |
| 6,798,193 B2 | 9/2004 | Zimmerman et al. |
| 6,815,944 B2 | 11/2004 | Vig et al. |
| 6,822,443 B1 | 11/2004 | Dogaru |
| 6,853,178 B2 | 2/2005 | Hayat-Dawoodi |
| 6,896,407 B2 | 5/2005 | Nomiyama et al. |
| 6,902,951 B2 | 6/2005 | Goller et al. |
| 6,917,321 B1 | 7/2005 | Haurie et al. |
| 7,023,205 B1 | 4/2006 | Krupp |
| 7,026,808 B2 | 4/2006 | Vig et al. |
| 7,031,170 B2 | 4/2006 | Daeche et al. |
| 7,038,448 B2 | 5/2006 | Schott et al. |
| 7,112,955 B2 | 9/2006 | Buchhold |
| 7,112,957 B2 | 9/2006 | Bicking |
| 7,126,327 B1 | 10/2006 | Busch |
| 7,184,876 B2 | 2/2007 | Teulings et al. |
| 7,190,784 B2 | 3/2007 | Li |
| 7,193,412 B2 | 3/2007 | Freeman |
| 7,199,579 B2 | 4/2007 | Scheller et al. |
| 7,253,614 B2 | 8/2007 | Forrest et al. |
| 7,259,545 B2 | 8/2007 | Stauth et al. |
| 7,265,531 B2 | 9/2007 | Stauth et al. |
| 7,269,992 B2 | 9/2007 | Lamb et al. |
| 7,285,952 B1 | 10/2007 | Hatanaka et al. |
| 7,292,095 B2 | 11/2007 | Burt et al. |
| 7,295,000 B2 | 11/2007 | Werth |
| 7,319,319 B2 | 1/2008 | Jones et al. |
| 7,323,780 B2 | 1/2008 | Daubenspeck et al. |
| 7,323,870 B2 | 1/2008 | Tatschl et al. |
| 7,325,175 B2 | 1/2008 | Momtaz |
| 7,345,468 B2 | 3/2008 | Okada et al. |
| 7,355,388 B2 | 4/2008 | Ishio |
| 7,361,531 B2 | 4/2008 | Sharma et al. |
| 7,362,094 B2 | 4/2008 | Voisine et al. |
| 7,365,530 B2 | 4/2008 | Bailey et al. |
| 7,368,904 B2 | 5/2008 | Scheller et al. |
| 7,385,394 B2 | 6/2008 | Auburger et al. |
| 7,425,821 B2 | 9/2008 | Monreal et al. |
| 7,474,093 B2 | 1/2009 | Ausserlechner |
| 7,476,953 B2 | 1/2009 | Taylor et al. |
| 7,518,354 B2 | 4/2009 | Stauth et al. |
| 7,592,801 B2 | 9/2009 | Bailey et al. |
| 7,598,601 B2 | 10/2009 | Taylor et al. |
| 7,605,647 B1 | 10/2009 | Romero et al. |
| 7,635,993 B2 | 12/2009 | Boeve |
| 7,694,200 B2 | 4/2010 | Forrest et al. |
| 7,701,208 B2 | 4/2010 | Nishikawa |
| 7,729,675 B2 | 6/2010 | Krone |
| 7,746,056 B2 | 6/2010 | Stauth et al. |
| 7,746,065 B2 | 6/2010 | Pastre et al. |
| 7,764,118 B2 | 7/2010 | Kusuda et al. |
| 7,768,083 B2 | 8/2010 | Doogue et al. |
| 7,769,110 B2 | 8/2010 | Momtaz |
| 7,772,838 B2 | 8/2010 | Bailey et al. |
| 7,800,389 B2 | 9/2010 | Friedrich et al. |
| 7,808,074 B2 | 10/2010 | Knittl |
| 7,816,772 B2 | 10/2010 | Engel et al. |
| 7,816,905 B2 | 10/2010 | Doogue et al. |
| 7,839,141 B2 | 11/2010 | Werth et al. |
| 7,915,886 B2 * | 3/2011 | Stolfus ............ G01P 13/045 324/165 |
| 7,923,996 B2 | 4/2011 | Doogue et al. |
| 7,936,144 B2 | 5/2011 | Vig et al. |
| 7,956,604 B2 | 6/2011 | Ausserlechner |
| 7,961,823 B2 | 6/2011 | Kolze et al. |
| 7,990,209 B2 | 8/2011 | Romero |
| 8,030,918 B2 | 10/2011 | Doogue et al. |
| 8,058,870 B2 | 11/2011 | Sterling |
| 8,063,634 B2 | 11/2011 | Sauber et al. |
| 8,080,993 B2 | 12/2011 | Theuss et al. |
| 8,089,276 B2 | 1/2012 | Kentsch |
| 8,106,654 B2 | 1/2012 | Theuss et al. |
| 8,128,549 B2 | 3/2012 | Testani et al. |
| 8,134,358 B2 | 3/2012 | Charlier et al. |
| 8,143,169 B2 | 3/2012 | Engel et al. |
| 8,253,210 B2 | 8/2012 | Theuss et al. |
| 8,362,579 B2 | 1/2013 | Theuss et al. |
| 8,610,430 B2 | 12/2013 | Werth et al. |
| 8,624,588 B2 | 1/2014 | Vig et al. |
| 8,729,890 B2 | 5/2014 | Donovan et al. |
| 8,773,124 B2 | 7/2014 | Ausserlechner |
| 9,116,018 B2 | 8/2015 | Frachon |
| 9,164,156 B2 | 10/2015 | Elian et al. |
| 9,201,123 B2 | 12/2015 | Elian et al. |
| 9,347,799 B2 | 5/2016 | Nazarian et al. |
| 2001/0002791 A1 | 6/2001 | Tsuge et al. |
| 2001/0009367 A1 | 7/2001 | Seitzer et al. |
| 2002/0027488 A1 | 3/2002 | Hayat-Dawoodi et al. |
| 2002/0084923 A1 | 7/2002 | Li |
| 2003/0001563 A1 | 1/2003 | Turner |
| 2003/0038675 A1 | 2/2003 | Gailus et al. |
| 2003/0062891 A1 | 4/2003 | Slates |
| 2003/0102909 A1 | 6/2003 | Motz |
| 2003/0107366 A1 | 6/2003 | Busch et al. |
| 2003/0173955 A1 | 9/2003 | Uenoyama |
| 2004/0032251 A1 | 2/2004 | Zimmerman et al. |
| 2004/0046248 A1 | 3/2004 | Waelti et al. |
| 2004/0062362 A1 | 4/2004 | Matsuya |
| 2004/0080314 A1 | 4/2004 | Tsujii et al. |
| 2004/0135220 A1 | 7/2004 | Goto |
| 2004/0155647 A1 | 8/2004 | Stauth et al. |
| 2004/0174164 A1 | 9/2004 | Ao |
| 2004/0184196 A1 | 9/2004 | Jayasekara |
| 2004/0189285 A1 | 9/2004 | Uenoyama |
| 2004/0252563 A1 | 12/2004 | Hckuto et al. |
| 2005/0120782 A1 | 6/2005 | Kishibata et al. |
| 2005/0167790 A1 | 8/2005 | Khor et al. |
| 2005/0179429 A1 | 8/2005 | Lohberg |
| 2005/0225318 A1 | 10/2005 | Bailey et al. |
| 2005/0258820 A1 | 11/2005 | Forster |
| 2005/0280411 A1 * | 12/2005 | Bicking ............ G01B 7/14 324/207.21 |
| 2006/0033487 A1 | 2/2006 | Nagano et al. |
| 2006/0038559 A1 | 2/2006 | Lamb et al. |
| 2006/0068237 A1 | 3/2006 | Murphy |
| 2006/0125473 A1 | 6/2006 | Frachon et al. |
| 2006/0175674 A1 | 8/2006 | Taylor |
| 2006/0181263 A1 | 8/2006 | Doogue et al. |
| 2006/0202692 A1 | 9/2006 | Tatschl et al. |
| 2006/0238190 A1 | 10/2006 | Ishio |
| 2006/0261801 A1 | 11/2006 | Busch |

(56) References Cited

U.S. PATENT DOCUMENTS

| | | |
|---|---|---|
| 2007/0110199 A1 | 5/2007 | Momtaz et al. |
| 2007/0247141 A1 | 10/2007 | Pastre et al. |
| 2007/0285089 A1 | 12/2007 | Ibuki et al. |
| 2008/0012558 A1 | 1/2008 | Rossler et al. |
| 2008/0013298 A1 | 1/2008 | Sharma et al. |
| 2008/0094055 A1 | 4/2008 | Monreal et al. |
| 2008/0116884 A1 | 5/2008 | Rettig et al. |
| 2008/0137784 A1 | 6/2008 | Krone |
| 2008/0237818 A1 | 10/2008 | Engel et al. |
| 2008/0238410 A1 | 10/2008 | Charlier et al. |
| 2009/0001964 A1 | 1/2009 | Strzalkowski |
| 2009/0001972 A1 | 1/2009 | Fernandez et al. |
| 2009/0058404 A1 | 3/2009 | Kurumado |
| 2009/0085706 A1 | 4/2009 | Baarman et al. |
| 2009/0102467 A1 | 4/2009 | Snell et al. |
| 2009/0140725 A1 | 6/2009 | Ausserlechner |
| 2009/0146647 A1 | 6/2009 | Ausserlechner |
| 2009/0152696 A1 | 6/2009 | Dimasacat et al. |
| 2009/0206827 A1 | 8/2009 | Aimuta et al. |
| 2009/0212765 A1 | 8/2009 | Doogue et al. |
| 2009/0315543 A1 | 12/2009 | Guo et al. |
| 2010/0026279 A1 | 2/2010 | Vig et al. |
| 2010/0045268 A1 | 2/2010 | Kilian |
| 2010/0072988 A1 | 3/2010 | Hammerschmidt et al. |
| 2010/0141249 A1 | 6/2010 | Ararao et al. |
| 2010/0188078 A1 | 7/2010 | Foletto et al. |
| 2010/0201356 A1 | 8/2010 | Koller et al. |
| 2010/0211347 A1 | 8/2010 | Friedrich et al. |
| 2010/0237450 A1 | 9/2010 | Doogue et al. |
| 2010/0276769 A1 | 11/2010 | Theuss et al. |
| 2010/0295140 A1 | 11/2010 | Theuss et al. |
| 2010/0330708 A1 | 12/2010 | Engel et al. |
| 2011/0018533 A1 | 1/2011 | Cesaretti et al. |
| 2011/0031960 A1 | 2/2011 | Hohe et al. |
| 2011/0048102 A1 | 3/2011 | Fernandez et al. |
| 2011/0074405 A1 | 3/2011 | Doogue et al. |
| 2011/0127998 A1 | 6/2011 | Elian et al. |
| 2011/0267040 A1 | 11/2011 | Frachon |
| 2011/0298448 A1 | 12/2011 | Foletto et al. |
| 2012/0007589 A1 | 1/2012 | Okada |
| 2012/0013333 A1 | 1/2012 | Ararao et al. |
| 2012/0019236 A1 | 1/2012 | Tiernan et al. |
| 2012/0086090 A1 | 4/2012 | Sharma et al. |
| 2012/0249133 A1* | 10/2012 | Friedrich ........... G01R 33/0005 324/247 |
| 2012/0274314 A1 | 11/2012 | Cesaretti et al. |
| 2013/0016845 A1 | 1/2013 | Fox |
| 2013/0113474 A1 | 5/2013 | Elian |
| 2013/0214774 A1 | 8/2013 | Cesaretti et al. |
| 2013/0278246 A1 | 10/2013 | Stegerer et al. |
| 2013/0335069 A1 | 12/2013 | Vig et al. |
| 2014/0084906 A1 | 3/2014 | Ruigrok et al. |
| 2014/0175584 A1 | 6/2014 | Foletto et al. |
| 2014/0176126 A1 | 6/2014 | Friedrich et al. |
| 2014/0266176 A1 | 9/2014 | Fernandez et al. |
| 2015/0022186 A1* | 1/2015 | Ausserlechner ....... G01D 5/145 324/207.2 |
| 2015/0022187 A1 | 1/2015 | Taylor et al. |
| 2015/0377648 A1* | 12/2015 | Sirohiwala ............ G01D 5/145 324/207.2 |
| 2016/0025820 A1 | 1/2016 | Scheller et al. |
| 2016/0123774 A1 | 5/2016 | Foletto et al. |

FOREIGN PATENT DOCUMENTS

| | | |
|---|---|---|
| DE | 40 31 560 | 4/1992 |
| DE | 195 39 458 A1 | 4/1997 |
| DE | 196 34 715 A1 | 3/1998 |
| DE | 196 50 935 A1 | 6/1998 |
| DE | 198 38 433 | 3/1999 |
| DE | 19851839 A1 | 11/1999 |
| DE | 199 61 504 A1 | 6/2001 |
| DE | 102 10 184 | 9/2003 |
| DE | 103 14 602 A1 | 10/2004 |
| DE | 10 2004017191 A1 | 10/2005 |
| DE | 10 2006 037 226 A1 | 2/2008 |
| DE | 10 2007 018 238 A1 | 10/2008 |
| DE | 10 2007 041 230 B3 | 4/2009 |
| DE | 10 2010 016 584 | 11/2010 |
| DE | 10 2011 102483 | 11/2012 |
| EP | 0 289 414 A2 | 11/1988 |
| EP | 0 289 414 A3 | 11/1988 |
| EP | 0 357 013 A2 | 3/1990 |
| EP | 0 357 013 A3 | 3/1990 |
| EP | 0 361 456 A2 | 4/1990 |
| EP | 0 361 456 A3 | 4/1990 |
| EP | 0 504 583 | 9/1992 |
| EP | 0629634 A1 | 12/1994 |
| EP | 0 680 103 A1 | 11/1995 |
| EP | 0 898 180 A2 | 2/1999 |
| EP | 0 944 888 B1 | 10/2001 |
| EP | 1 443 332 A1 | 8/2004 |
| EP | 1 580 560 A1 | 9/2005 |
| EP | 1 637 898 A1 | 3/2006 |
| EP | 1 662 353 A1 | 5/2006 |
| EP | 1 679 524 A1 | 7/2006 |
| EP | 1 850 143 A1 | 10/2007 |
| EP | 2 063 229 | 5/2009 |
| EP | 2402719 | 1/2012 |
| EP | 2 730 893 | 5/2014 |
| FR | 2 748 105 | 10/1997 |
| FR | 2 909 756 | 6/2008 |
| GB | 2276727 A | 10/1994 |
| GB | 2481482 | 12/2011 |
| JP | 61-43777 | 3/1986 |
| JP | 363 084176 A | 4/1988 |
| JP | 63-263782 | 10/1988 |
| JP | 63-300911 | 12/1988 |
| JP | H02-116753 | 5/1990 |
| JP | 02-149013 | 6/1990 |
| JP | H03-29817 | 2/1991 |
| JP | 04-152688 | 5/1992 |
| JP | H06-273437 | 9/1994 |
| JP | 08-97486 | 4/1996 |
| JP | 09-166612 | 6/1997 |
| JP | H 1038988 | 2/1998 |
| JP | 10-332725 | 12/1998 |
| JP | H 10318784 | 12/1998 |
| JP | 11-74142 | 3/1999 |
| JP | 11-084363 | 3/1999 |
| JP | 2000-183241 A | 6/2000 |
| JP | 2001-043475 | 2/2001 |
| JP | 2001-141738 A | 5/2001 |
| JP | 2001-165702 | 6/2001 |
| JP | 2001-1659951 | 6/2001 |
| JP | 2002-117500 | 4/2002 |
| JP | 2002-149013 | 5/2002 |
| JP | 2002-357920 | 12/2002 |
| JP | 2003-177171 | 6/2003 |
| JP | 2004-055932 | 2/2004 |
| JP | 2004-093381 | 3/2004 |
| JP | 2004-152688 | 5/2004 |
| JP | 2004-356338 | 12/2004 |
| JP | 2004-357858 | 12/2004 |
| JP | 2005-517928 | 6/2005 |
| JP | 2005-337866 | 12/2005 |
| JP | 2005-345302 | 12/2005 |
| JP | 2006-003096 | 1/2006 |
| JP | 2007-012582 A | 1/2007 |
| JP | 2007-218799 | 8/2007 |
| JP | 2008-264569 | 11/2008 |
| WO | WO 88/09026 | 11/1988 |
| WO | WO 93/12403 | 6/1993 |
| WO | WO 1993/12403 | 6/1993 |
| WO | WO 94/08203 | 4/1994 |
| WO | WO 1994/08203 | 4/1994 |
| WO | WO 95/18982 | 7/1995 |
| WO | WO 1995/18982 | 7/1995 |
| WO | WO 98/02849 A1 | 2/1996 |
| WO | WO 1999/49322 | 9/1999 |
| WO | WO 2001/74139 A2 | 10/2001 |
| WO | WO 2001/74139 A3 | 10/2001 |
| WO | WO 2003/069358 A2 | 8/2003 |

(56) References Cited

FOREIGN PATENT DOCUMENTS

| | | |
|---|---|---|
| WO | WO 2003/069358 A3 | 8/2003 |
| WO | WO 2003/107018 A1 | 12/2003 |
| WO | WO 2004/027436 | 4/2004 |
| WO | WO 2004/072672 A1 | 8/2004 |
| WO | WO 2005/013363 A2 | 2/2005 |
| WO | WO 2005/013363 A3 | 2/2005 |
| WO | WO 2006/056829 | 6/2006 |
| WO | WO 2006/083479 | 8/2006 |
| WO | WO 2007/138508 A1 | 12/2007 |
| WO | WO 2008/008140 A2 | 1/2008 |
| WO | WO 2008/008140 A3 | 1/2008 |
| WO | WO 2008/048379 A1 | 4/2008 |
| WO | WO 2008/121443 A1 | 10/2008 |
| WO | WO 2008/145662 A1 | 12/2008 |
| WO | WO 2009/108422 A2 | 9/2009 |
| WO | WO 2009/108422 A3 | 9/2009 |
| WO | WO 2010/014309 A1 | 2/2010 |
| WO | WO 2010/065315 | 6/2010 |
| WO | WO 2010/096367 A1 | 8/2010 |
| WO | WO 2011/011479 | 1/2011 |
| WO | WO 2012/148646 | 11/2012 |
| WO | WO 2013/169455 | 11/2013 |

OTHER PUBLICATIONS

Response filed on Nov. 9, 2016 to the Non-Final Office Action dated Aug. 26, 2016; for U.S. Appl. No. 13/946,380; 19 pages.
Response to Office Action filed on Nov. 9, 2016 for U.S. Appl. No. 13/946,380; 19 pages.
EP Response filed on Dec. 9, 2016 to Official Communication dated Oct. 14, 2016 regarding European Pat. Appl. No. 14742067.3; 23 pages.
Final Office Action dated Jan. 12, 2017 for U.S. Appl. No. 13/946,380; 32 pages.
European Search Report dated Apr. 5, 2017 for EP Pat. Appl. No. 16192498.0: 10 pages.
Request for Continued Examination filed on Apr. 11, 2017 for U.S. Appl. No. 13/946,380; 3 pages.
Amendment filed on Apr. 11, 2017 for U.S. Appl. No. 13/946,380; 18 pages.
Office Action dated May 19, 2017 for U.S. Appl. No. 13/946,380; 20 pages.
Response to Office Action filed on Jun. 22, 2017 for U.S. Appl. No. 13/946,380; 8 pages.
Notice of Allowance dated Jul. 13, 2017 for U.S. Appl. No. 13/946,380; 11 pages.
PCT Search Report and Written Opinion dated Jul. 31, 2017 for PCT Application PCT/US2017/033057; 11 pages.
Response to Notice to File Corrected Application Papers dated Aug. 28, 2017 and flied on Aug. 29, 2017 for U.S. Appl. No. 13/946,380; 3 pages.
U.S. Appl. No. 13/439,094, filed Apr. 4, 2012, Friedrich et al.
U.S. Appl. No. 13/748,999, filed Jan. 24, 2013, Vig et al.
U.S. Appl. No. 13/871,131, filed Apr. 26, 2013, David et al.
U.S. Appl. No. 15/176,665, filed Jun. 8, 2016, Vig et al.
Kapser et al.; "Integrated GMR Based Wheel Speed Sensor for Automotive Applications;" IEEE 2007 Conference on Sensors; Oct. 2007; pp. 848-851.
Oniku et al.; "High-Energy-Density Permanent Micromagnets Formed From Heterogeneous Magnetic Powder Mixtures;" IEEE 25th International Conference on Micro Electro Mechanical Systmes, Jan. 2012; 4 pages.
Office Action dated Jul. 9, 2015; for U.S. Appl. No. 13/946,380; 63 pages.
Response filed Nov. 9, 2015; to Office Action dated Jul. 9, 2015; for U.S. Appl. No. 13/946,380; 26 pages.
Final Office Action dated Dec. 15, 2015; for U.S. Appl. No. 13/946,380; 36 pages.
Response to Final Office Action filed on Apr. 12, 2016, dated Dec. 15, 2015; for U.S. Appl. No. 13/946,380; 17 pages.
Request for Continued Examination filed Apr. 12, 2015; for U.S. Appl. No. 13/946,380; 2 pages.
Office Action dated Jul. 23, 2016 for U.S. Appl. No. 14/529,669; 78 pages.
Office Action dated Jul. 14, 2016 for U.S. Appl, No, 14/529,594; 94 pages.
PCT Invitation to Pay Additional Fees and Partial Search Report dated Nov. 4, 2014; for PCT Pat. App. No. PCT/US2014/044236; 6 pages.
PCT International Preliminary Report on Patentability and Written Opinion of the ISA dated Jan. 28, 2016; for PCT Pat. App. No. PCT/US2014/044236; 17 pages.
PCT International Search Report and Written Opinion of the ISA dated Jan. 15, 2016; for PCT Pat. App. No. PCT/US2015/055236; 12 pages.
PCT International Search Report and Written Opinion of the ISA dated Dec. 23, 2015; for PCT Pat. App. No. PCT/US2015/055233; 12 pages.
PCT International Search Report and Written Opinion of the ISA dated Aug. 3, 2018; for PCT Application No. PCT/US2015/055230; 12 pages.
PCT International Search Report and Written Opinion of the ISA dated Feb. 4 2016; for PCT Pat. App. No. PCT/US2015/055474; 15 pages.
U.S. Appl. No. 13/946,010, filed Jul. 19, 2013, David et al.
U.S. Appl. No. 13/946,400, filed Jul. 19, 2013, David et al.
U.S. Appl. No. 13/946,417, filed Jul. 19, 2013, Burdette et al.
U.S. Appl. No. 13/946,830, filed Jul. 19, 2013, Taylor et al.
U.S. Appl. No. 14/529,577, filed Oct. 31, 2014, Foletto et al.
U.S. Appl. No. 14/529,594, filed Oct. 31, 2014, Drouin et al.
U.S. Appl. No. 14/529,606, filed Oct. 31, 2014, Foletto et al.
U.S. Appl. No. 14/529,669, filed Oct. 31, 2014, David et al.
Office Action in U.S. appl. No. 13/468,478 dated Jan. 15, 2014, 36 pages.
International Search Report and Written Opinion dated Oct. 28, 2014 for Int'l PCT Application PCT/US2014/044991; 12 pages.
International Search Report and Written Opinion dated Nov. 4, 2014 for Int'l PCT Application PCT/US2014/044993; 13 pages.
PCT Search Report and Written Opinion of the ISA dated Dec. 19, 2014; for PCT Pat. App. No. PCT/US2014/044236; 23 pages.
U.S. Appl. No. 12/840,324, filed Jul. 21, 2010, Casaretti et al.
U.S. Appl. No. 12/959,672, filed Dec. 3, 2010, Doogue et al.
U.S. Appl. No. 12/968,353, filed Dec. 15, 2010, Donovan et al.
U.S. Appl. No. 13/095,371, filed Apr. 27, 2011, Cesaretti et al.
U.S. Appl. No. 13/350,970, filed Jan. 16, 2012, Milano et al.
U.S. Appl. No. 13/398,127, filed Feb. 16, 2012, Cesaretti et al.
U.S. Appl. No. 13/424,618, filed Apr. 20, 2012, Doogue et al.
U.S. Appl. No. 13/526,106, filed Jun. 18, 2013, Vig et al.
Ahn et al., "A New Toroidal-Meander Type Integrated Inductor With A Multilevel Meander Magnetic Core", IEEE Transactions on Magnetics, vol. 30, No. 1, Jan. 1994, pp. 73-79.
Allegro "Two-Wire True Zero Speed Miniature Differential Peak-Detecting Gear Tooth Sensor;" ATS646LSH; 2004; Allegro MicroSystems, Inc., Worcester, MA 01615; pp. 1-14.
Allegro Microsystems, Inc. Data Sheet A1341; "High Precision, Highly Programmable Linear Hall Effect Sensor IC with EEPROM, Output Protocols SENT and PWM, an Advanced Output Linearization Capabilities;" May 17, 2010; 46 pages.
Allegro Microsystems, Inc. Data Sheet ATS601LSG; "Non-TPOS, Tooth Detecting Speed Sensor;" Nov. 1, 2011; 9 pages.
Allegro Microsystems, Inc., "Gear-Tooth Sensor for Automotive Applications," Aug. 3, 2001.
Allegro MicroSystems, Inc., Hall-Effect IC Applications Guide, http://www.allegromicro.com/en/Products/Design/an/an27701.pdf, Copyright 1987, 1997, pp. 1-36.
Alllegro "True Zero-Speed Low-Jitter High Accuracy Gear Tooth Sensor;" ATS825LSG; 2005; Allegro McroSystems, Inc. Worcester, MA 01615; pp. 1-21.
Ausserlechner et al.; "Compensation of the Piezo-Hall Effect in Integrated Hall Sensors on (100)-Si;" Sensors Journal, vol. 7, No. 11; Nov. 2007; ISBN: 1530-437X; pp. 1475-1482.

(56) References Cited

OTHER PUBLICATIONS

Ausserlechner et al.; "Drift of Magnetic Sensitivity of Small Hall Sensors Due to Moisture Absorbed by the IC-Package;" Proceedings of IEEE Sensors, 2004; vol. 1; Oct. 24, 2004; ISBN:0-7803-8692-2; pp. 455-458.
Ausserlechner; "Limits of Offset Cancellation by the Principle of Spinning Current Hall Probe;" Proceedings of IEEE Sensors; Oct. 2004; pp. 1117-1120.
Ausserlechner; "The piezo-Hall effect in n-silicon for arbitrary crystal orientaton;" Proceedings of IEEE Sensors; vol. 3; Oct. 24, 2004; ISBN: 0-7803-8692-2; pp. 1149-1152.
Bahreyni, et al.; "A Resonant Micromachined Magnetic Field Sensor;" IEEE Sensors Journal; vol. 7, No. 9, Sep. 2007; pp. 1326-1334.
Barrettino, et al.; "CMOS-Based Monolithis Controllers for Smart Sensors Comprising Micromembranes and Microcantilevers;" IEEE Transactions on Circuits and System-I Regular Papers vol. 54, No. 1; Jan. 2007; pp. 141-152.
Baschirotto et al.; "Development and Anaiysis of PCB Vector 2-D Magnetic Field Sensor System for Electronic Compass;" IEEE Sensors Journal vol. 6, No. 2; Apr. 2006; pp. 365-371.
Bilotti et al.; "Monolithic Magnetic Hall Sensor Using Dynamic Quardrature Offset Cancellation," IEEE Journal of Solid-State Circuits; vol. 32, Issue 6; Jun. 1997; pp. 829-835.
Bowers et al., "Microfabrication and Process Integration of Powder-Based Permanent Magnets", Interdisciplinary Microsystems Group, Dept. Eiectrical and Computer Engineering, University of Florida, USA; Technologies for Future Micro-Nano Manufacturing Workshop, Napa, California, Aug. 8-10, 2011, pp. 162-165.
Demierre, et al.; "Reference Magnetic Actuator for Self-Calibration of a Very Small Hall Sensor Array;" Sensors and Actuators A97-98; Apr. 2002; pp. 39-46.
Dwyer, "Back-Biased Packaging Advances (SE, SG & SH versus SA & SB)," http://www.allegromicro.com/en/Products/Design/packaging_advances/index.asp, Copyright 2008, pp. 1-5.
Frick, et al.; "CMOS Microsystem for AC Current Measurement with Galvanic Isolation;" IEEE Sensors Journal; vol. 3, No. 6; Dec. 2003; pp. 752-760.
Halg; "Piezo-Hall Coefficients of n-Type Silicon;" Journal of Applied Physics; vol. 84, No. 1; Jul. 1, 1988; pp. 276-282.
Honeywell International, Inc., "Hall Effect Sensing and Application," Micro Switch Sensing and Control, Chapter 3, http://content.honeywell.com/sensing/prodinfo/solidstate/technical/hallbook.pdf, date unavailable but believed to be before Jan. 2008, pp. 9-18.
Hosticka; "CMOS Sensor Systems;" Sensors and Actuators A66; Apr. 1998; pp. 335-341.
Infineon Product Brief, TLE 4941plusC, Differential Hall IC for Wheel Speed Sensing, Oct. 2010, www.infineon.com/sensors, 2 pages.
Infineon Technologies; "Differential Two-Wire Hall Effect Sensor IC;" TLE4942 Preliminary Data Sheet; Jun. 2000; pp. 1-13.
Johnson et al., "Hybrid Hall Effect Device," Appl. Phys. Lett., vol. 71, No. 7, Aug. 1997, pp. 974-976.
Kanda et al.; "The Piezo-Hall Effect in n-Silicon;" $22^{nd}$ International Conference on the Physics of Semiconductors; vol. 1, Jan. 1995; pp. 89-92.
Krammerer et al.; "A Hall effect sensors network insensitive to mechanical stress;" Proceedings of IEEE Sensors; vol. 3, Oct. 2004; pp. 1071-1074.
Lagorce et al.; "Magnetic and Mechanical Properties of Micromachined Strontium Ferrite/Polyimide Composites;" Journal of Microelectromechanical Systems; vol. 6, No. 4; Dec. 1997; pp. 307-312.
Lequesne et al.; "Hgh-Accuracy Magnetic Position Encoder Concept;" IEEE Transactions on Industry Applications; vol. 35, No. 3; May/Jun. 1999; pp. 568-576.
Magnani et al.; "Mechanicai Stress Measurement Electronics Based on Piezo-Resistive and Piezo-Hall Effects;" $9^{th}$ International Conference on Electronics, Circuits and Systems 2002; vol. 1; SBN: 0-7803-7596-3; Dec. 2002; pp. 363-366.

Manic et al.; "Short and Long-Term Stability Problems of Hall Plates in Plastic Packages;" IEEE $38^{th}$ Annual International Reliability Physics Symposium; Apr. 2000; pp. 225-230.
Manic; "Drift in Silicon Integrated Sensors and Circuits Due to the Thermo-Mechanicai Stresses;" Lausanne, Écote Polytechnique Fédérale De Lausanne 2000; Part 1 of 2; 74 pages.
Manic; "Drift in Silicon Integrated Sensors and Circuits Due to the Thermo-Mechanical Stresses" Lausanne, École Polytechnique Fédérale De Lausanne 2000; Part 2 of 2; 102 pages.
Melexis Microelectronic Systems, Hall Applications Guide, Section 3—Appiications,1997 (48 pages).
Motz et al.; "An Integrated Magnetic Sensor with Two Continuous-Time ΔΣ-Converters and Stress Compensation Capability," IEEE International Solid-State Circuits Conference; Digest of Technical Papers; Feb. 6, 2006; ISBN: 1-4244-0079-1; pp. 1151-1160.
Motz et al.; "A Chopped Hall Sensor with Small Jitter and Programmable "True Power-On" Function;" IEEE Journal of Solid-State Circuits; vol. 40, No. 7; Jul. 2005; pp. 1533-1540.
Motz, et al.; "An Integrated Hall Sensor Platform Design for Position, Angle and Current Sensing;" IEEE Sensors 2006; Exco, Daegu, Korea / Oct. 22-25, 2006; pp. 1008-1011.
Manter; "A Low-offset Spinning-current Hall Plate;" Sensors and Actuators A21-A23; 1990; pp. 742-746.
Munter; "Electronic Circuitry for a Smart Spinning-current Hall Plate with Low Offset;" Sensors and Actuators A; Jun. 1991; pp. 747-751.
Oniku et al., "High-Energy-Density Permanent Micromagnets Formed From Heterogeneous Magnetic Powder Mixtures", Interdisciplinary Microsystems Group, Dept. of Electrical and Computer Engineering, University of FL, Gainesville, FL 32611, USA; Preprint of MEMS 2012 Conf. Paper; Jan. 2012; 4 pages.
Park et al.: "Batch-Fabricated Microinductors with Electroplated Magnetically Anisotropic and Laminated Alloy Cores", IEEE Transactions on Magnetics, vol. 35, No. 5, Sep. 1999, 10 pages.
Park et al; "Ferrite-Based Integrated Planar Inductors and Transformers Fabricated at Low Temperature;" IEEE Transactions on Magnetics; vol. 33, No. 5; Sep. 1997; pp. 3322-3324.
Partin et al.; "Temperature Stable Hall Effect Sensors;" IEEE Sensors Journal, vol. 6, No. 1; Feb. 2006; pp. 106-110.
Paste, et al.; "A Hall Sensor Analog Front End for Current Measurement with Continuous Gain Calibration;" IEEE Sensors Journal; vol. 7, No. 5; May 2007; pp. 860-667.
Pastre, et al.; "A Hall Sensor-Based Current Measurement Microsystem With Continuous Gain Calibration;" Research in Microelectronics and Electronics, IEEE vol. 2; Jul. 25, 2005; ISBN; 0-7803-9345-7; pp. 95-98.
Popovic; "Sensor Microsystems;" Proc. $20^{th}$ International Conference on Microelectronics (MWIL 95); vol. 2, NIS, Serbia, 12-14; Sep. 1995; pp. 531-537.
Randhawa; "Monolithic Integrated Hall Devices in Silicon Circuits:" Microelectronics Journal; vol. 12, No. 6; Sep. 14-17, 1981; pp. 24-29.
Robert Bosch GMBH Stuttgart "Active Sensor for ABS/ASR/VDC-Systerns with 2-Wire-Current Interface;" Specification TLE4941/TLE4942; Version 5; Jun. 25, 2000; 44 pages.
Ruther et al.; "Integrated CMOS Based Sensor Array for Mechanical Stress Mapping;" $5^{th}$ IEEE Conference on Sensors, Oct. 2007; pp. 1131-1134.
Ruther et al.; "Thermomagnetic Residual Offset in Integrated Hall Plates;" IEEE Sensors Journal; vol. 3, No. 6; Dec. 2003; pp. 693-699.
Sargent; "Switched-capacitor IC controls feedback loop;" EDN; Design Ideas; Feb. 17, 2000; pp. 154 and 156.
Schneider; "Temperature Calibration of CMOS Magnetic Vector Probe for Contactless Angle Measurement System," IEDM 1996 pp. 533-536.
Schott et al.; "Linearizing Integrated Hall Devices;" 1997 International Conference on Solid-State Sensors and Actuators, Jun. 16-19, 1997; pp. 393-396.
Schott, et al.; "CMOS Single-Chip Electronic Compass with Microcontroller;" IEEE Journal of Solid-State Circuits; vol. 42, No. 12; Dec. 2007; pp. 2923-2933.

(56) References Cited

OTHER PUBLICATIONS

Simon et al.; "Autocalibration of Silicon Hall Devices;" 8th International Conference on Solid-State Sensors and Actuators; vol. 2; Jun. 25, 1995; pp. 237-240.
Smith et al.; "Low Magnetic Field Sensing with GMR Sensors;" Sensor Magazine; Part 1; Sep. 1999; http://archives.sensorsmag.com/articles/0999/76mail.shtml; pp. 1-8.
Smith et al.; "Low Magnetic Field Sensing with GMR Sensors;" Sensor Magazine; Part 2; Oct. 1999; http://archives.sensorsmag.com/articles/1099/84/mail.shtml; pp. 1-11.
Steiner et al.; "Double-Hall Sensor with Self-Compensated Offset;" International Electron Devices Meeting; Dec. 7, 1997; ISBN: 0-7803-4100-7; pp. 911-914.
Steiner et al; Offset Reduction in Hall Devices by Continuous Spinning Current Method; Sensors and Actuators A66; 1998; pp. 167-172.
Stellrecht et al.; Characterization of Hygroscopic Swelling Behavior of Mold Compounds and Plastic Packages; IEEE Transactions on Components and Packaging Technologies; vol. 27, No. 3; Sep. 2004; pp. 499-506.
Tian et al.; "Multiple Sensors on Pulsed Eddy-Current Detection for 3-D Subsurface Crack Assessment;" IEEE Sensors Journal, vol. 5, No. 1; Feb. 2005; pp. 90-96.
Trontelj et al; "CMOS Integrated Magnetic Field Source Used as a Reference in Magnetic Field Sensors on Common Substrate;" WEP 1-6; IMTC; May 1994; pp. 461-463.
Wu, et al.; "A Chopper Current-Feedback Instrumentation Amplifier with a 1mHz 1/fNoise Corner and an AC-Coupled Ripple-Reduction Loop;" IEEE international Soiid-State Circuits Conference; Feb. 10, 2009; pp. 322-324.
Zou et al.; "Three-Dimensionai Die Surface Stress Measurements in Delaminated and Non-Delaminated Plastic Packages;" 48th Electronic Components and Technology Conference; May 25, 1998; pp. 1223-1234.
Office Action/Restriction Requirement dated May 14, 2010; for U.S. Appl. No. 12/037,393; 6 pages.
Response to Office Action/Restriction Requirement dated May 14, 2010; for U.S. Appl. No. 12/037,393; 1 page.
Office Action dated Jun. 30, 2010; for U.S. Appl. No. 12/037,393; 21 pages.
Response to Office Action dated Jun. 30, 2010; for U.S. Appl. No. 12/037,393; 34 pages.
Notice of Allowance dated Nov. 3, 2010; for U.S. Appl. No. 12/037,393; 7 pages
Request for Continued Examination dated Jan. 25, 2011; for U.S. Appl. No. 12/037,393; 1 page.
Notice of Allowance dated Feb. 11, 2011; for U.S. Appl. No. 12/037,393; 8 pages.
Office Action dated Feb. 2, 2011; for U.S. Appl. No. 12/959,672; 13 pages.
Response to Office Action dated Feb. 2, 2011; for U.S. Appl. No. 12/959,672; 8 pages.
Notice of Allowance dated Jun. 27, 2011; for U.S. Appl. No. 12/959,672; 8 pages.
Request for Continued Examination dated Jul. 12, 2011; for U.S. Appl. No. 12/959,672; 2 pages.
Notice of Allowance dated Jul. 19, 2011; for U.S. Appl. No. 12/959,672; 8 pages.
Office Action/Restiction Requirement dated Apr. 12, 2012; for U.S. Appl. No. 12/183,367; 6 pages.
Response to Office Action/Restriction Requirement dated Apr. 12, 2013; for U.S. Appl. No. 12/183,367;2 pages.
Office Action dated May 12, 2011; for U.S. Appl. No. 12/183,367; 17 pages.
Response to Office Action dated May 12, 2011; for U.S. Appl. No. 12/183,367; 13 pages.
Office Action dated Oct. 20, 2011; for U.S. Appl. No. 12/183,367; 11 pages.
Supplemental Response to Restriction Requirement dated Feb. 6, 2013; for U.S. Appl. No. 12/183,367; 2 pages.
Response to Office Action dated Oct. 20, 2011; for U.S. Appl. No. 12/183,367; 15 pages.
Final Office Action dated May 2, 2013; for U.S. Appl. No. 12/183,367; 15 pages.
Response to Final Office Action dated May 2, 2013; for U.S. Appl. No. 12/183,367; 8 pages.
Final Office Action dated Jul. 1, 2013; for U.S. Appl. No. 12/183,367; 6 pages.
Final Office Action dated Jul. 23, 2013; for U.S. Appl. No. 12/183,367; 8 pages.
Response to Office Action dated Jul. 23, 2013; for U.S. Appl. No. 12/183,367; 13 pages.
Notice of Allowance dated Sep. 6, 2013; for U.S. Appl. No. 12/183,367; 7 pages.
Office Action dated Jun. 7, 2012; for U.S. Appl. No. 12/360,889; 9 pages.
Response to Office Action dated Jun. 7, 2012; for U.S. Appl. No. 12/360,889; 11 pages.
Office Action dated Jan. 18, 2013; for U.S. Appl. No. 12/360,889; 7 pages.
Response to Office Action dated Jan. 18, 2013; for U.S. Appl. No. 12/360,889; 6 pages.
Office Action dated Jun. 28, 2013; for U.S. Appl. No. 12/360,889; 7 pages.
Response to Office Action dated Jun. 28, 2013; for U.S. Appl. No. 12/360,889; 15 pages.
Office Action/Restriction Requirement dated Oct. 23, 2009; for U.S. Appl. No. 12/328,798; 7 pages.
Response to Office Action/Restriction Requirement dated Oct. 23, 2009; for U.S. Appl. No. 12/328,798; 1 page.
Office Action dated Dec. 14, 2009; for U.S. Appl. No. 12/328,798; 20 pages.
Response to Office Action dated Dec. 14, 2009; for U.S. Appl. No. 12/328,798; 22 pages.
Office Action dated May 24, 2010; for U.S. Appl. No. 12/328,798; 22 pages.
Response to Office Action dated May 24, 2010; for U.S. Appl. No. 12/328,798: 23 pages.
Office Action dated Oct. 31, 2011; for U.S. Appl. No. 12/328,798; 23 pages.
Response to Office Action dated Oct. 31, 2011; for U.S. Appl. No. 12/328,798; 14 pages.
Final Office Action dated May 10, 2012; for U.S. Appl. No. 12/328,798; 17 pages.
Response to Final Office Action dated May 10, 2012; for U.S. Appl. No. 12/328,798; 6 pages.
Request for Continued Examination dated Aug. 9, 2012; for U.S. Appl. No. 12/328,798; 1 page.
Notice of Allowance dated Oct. 26, 2012; for U.S. Appl. No. 12/328,798; 13 pages.
Request for Continued Examination dated Jan. 24, 2013; for U.S. Appl. No. 12/328,798; 3 pages.
Notice of Allowance dated Mar. 1, 2013; for U.S. Appl. No. 12/328,798; 10 pages.
Office Action dated Feb. 22, 2012; for U.S. Appl. No. 13/241,380; 23 pages.
Response to Office Action dated Feb. 22, 2012; for U.S. Appl. No. 13/241,380; 16 pages.
Office Action dated Jul. 19, 2012; for U.S. Appl. No. 13/241,380; 18 pages.
Response to Office Action dated Jul. 19, 2012; for U.S. Appl. No. 13/241,380; 6 pages.
Notice of Allowance dated Oct. 29, 2012; for U.S. Appl. No. 13/241,380; 23 pages.
Request for Continued Examination dated Jan. 24, 2013; for U.S. Appl. No. 13/241,380; 3 pages.
Notice of Allowance dated Feb. 21, 2013; for U.S. Appl. No. 13/241,380; 9 pages.
Office Action dated Jul. 6, 2012; for U.S. Appl. No. 12/706,318; 29 pages.
Response to Office Action dated Jul. 6, 2012; for U.S. Appl. No. 12/706,318; 12 pages.

(56) References Cited

OTHER PUBLICATIONS

Supplemental Response to Office Action dated Jul. 6, 2012; for U.S. Appl. No. 12/706,318; 12 pages.
Notice of Allowance dated Dec. 10, 2012; for U.S. Appl. No. 12/706,318; 9 pages.
Office Action dated Sep. 11, 2012; for U.S. Appl. No. 12/840,324; 30 pages.
Response to Office Action dated Sep. 11, 2012; for U.S. Appl. No. 12/840,324; 15 pages.
Final Office Action dated Feb. 12, 2013; for U.S. Appl. No. 12/840,324; 19 pages.
Response to Final Office Action dated Feb. 12, 2013; for U.S. Appl. No. 12/840,324; 12 pages.
Notice of Allowance dated May 24, 2013; for U.S. Appl. No. 12/840,324; 12 pages.
Corrected Notice of Allowability dated Jul. 17, 2013; for U.S. Appl. No. 12/840,324; 7 pages.
Corrected Notice of Allowability dated Aug. 9, 2013; for U.S. Appl. No. 12/840,324; 6 pages.
Office Action dated Jun. 11, 2013; for U.S. Appl. No. 13/095,371; 31 pages.
Response to Office Action dated Jun. 11, 2013; for U.S. Appl. No. 13/096,371; 25 pages.
Notice of Allowance dated Oct. 28, 2013; for U.S. Appl. No. 13/095,371; 19 pages.
European Board of Appeals Decision dated Feb. 28, 2005; for European Pat. App. No. 03 710 766.1; 14 pages.
European Communication for the Board of Appeals dated Apr. 30, 2009; for European Pat. App. No. 03 710 766.1; 2 pages.
European Board of Appeals Datasheet for the Decision dated Nov. 22, 2007; for European Pat. App. No. 03 710 766.1; 22 pages.
European Preliminary Amendment from the Board of Appeal dated May 26, 2009; for European Pat. App. No. 03 710 766.1; pages.
Letter from Yuasa and Hara dated Jun. 4, 2008; Japanese First Office Action dated Apr. 7, 2008; for JP Pat. App. No. 2009-568426; 5 pages.
Letter from Yuasa and Hare dated Oct. 21; 2008; Japanese Response to First Office Action filed Sep. 22, 2008; for JP Pat. App. No. 2009-588426; 14 pages.
Letter from Yuasa and Hara dated Dec. 12, 2008; Japanese Second Office Action; for JP Pat. App. No. 2009-568426; 4 pages.
Letter from Yuasa and Hara dated Apr. 23, 2009; Japanese Response to Second Office Action filed Mar. 25, 2009; for JP Pat. App. No. 2009-568426; 8 pages.
Letter from Yuasa and Hara dated Jan. 17, 2011; Japanese Third Office Action dated Feb. 16, 2011; for JP Pat. App. No. 2009-568426; 5 pages.
Letter from Yuasa and Hara dated Jun. 9, 2011; Japanese Response to Third Office Action filed May 13, 2011; for JP Pat. App. No. 2009-568426; 27 pages.
Japanese Notice of Allowance dated Nov. 8, 2011; for Japanese Pat. App No. 2009-568426; 3 pages.
Letter from NTD Patent & Trademark Agency Limited dated Oct. 13, 2010; for Chinese Pat. App. No. 200880008895.3; 2 pages.
Chinese Office Action (with English translation) dated Sep. 9, 2010; for Chinese Pat. App. No. 200880008895.3; 12 pages.
Letter from NTD Patent & Trademark Agency Limited dated Mar. 28, 2011; for Chinese Pat. App. No. 200880008895.3; 1 page.
Chinese Response to Office Action; for Chinese Pat. App. No. 200880008895.3; 7 pages.
Chinese Notice of Allowance (with Engilsh translation) dated Jul. 4, 2011; for Chinese Pat. App. No. 200880008895.3; 4 pages.
Letter from Yuasa and Hara dated Jul. 26, 2012; for Japanese Pat. App. No. 2010-201028; 5 pages.
Japanese First Office Action (English translation); for Japanese Pat. App. No. 2010-201028; 5 pages.
Letter from Yuasa and Hara dated Oct. 16, 2012; for Japanese Pat. App. No. 2010-201028 2 pages.
Japanese Response to First Office Action (with English translation); for Japanese Pat. App. No. 2010-201028; 10 pages.

Letter from Yuasa and Hara dated Aug. 7; 2013; for Japanese Pat. App. No. 2010-201028; 4 pages.
Japanese Second Office Action (Engliish translation); for Japanese Pat. App. No. 2010-201028; 3 pages.
Letter from NTD Patent and Trademark Office dated Oct. 10, 2012; for Chinese Pat. App. No. 200980106535.4; 2 pages.
Chinese First Office Action (with Engiish translation) dated Aug. 29, 2012; for Chinese Pat. App. No. 200980106535.4; 8 pages.
Letter to NTD Patent and Trademark Office dated Dec. 11, 2012; for Chinese Pat. App. No. 200980106535.4; 8 pages.
Letter from NTD Patent and Trademark Office dated Jan. 19, 2013; for Chinese Pat. App. No. 200980106535,4; 1 page.
Response to Chinese First Office Action dated Aug. 29, 2012; for Chinese Pat. App. No. 200080106535.4; 12 pages.
Letter from NTD Patent and Trademark Office dated May 21, 2013; for Chinese Pat App. No. 200980106535.4; 2 pages.
Chinese Second Office Action (with-English translation) dated Apr. 15, 2013; for Chinese Pat. App. No. 200980106535.4; 9 pages.
Letter to NTD Patent and Trademark Agency dated Jun. 19, 2013; for Chinese Pat. App. No. 200980106535.4; 11 pages.
Letter from NTD Patent and Trademark Agency dated Jul. 11, 2013; for Chinese Pat. App. No. 200980106535.4; 1 page.
Response to Chinese Second Office Action dated Aug. 29, 2012; for Chinese Pat. App. No. 200980106535.4; 12 pages.
Letter from Yuasa and Hara dated May 27, 2013; for Japanese Pat. App. No. 2010-547666; 2 pages.
Japanese Notice of Reasons for Rejection (English translation) for Japanese Pat. App. No. 2010-547666; 4 pages.
Emaii from NTD Patent and Trademark Office dated Jun. 11, 2012; for Chinese Pat. App. No. 200920783766.7; 2 pages.
Japanese First Office Action (with Engiish transiation) dated May 3, 2012; for Chinese Pat. App. No. 200920783766.7; 13 pages.
Letter to NTD Patent and Trademark Office dated Aug. 29, 2012; for Chinese Pat. App. No. 200920783766.7; 20 pages.
Letter from NTD Patent and Trademark Office dated Oct. 18, 2012; for Chinese Pat. App. No. 200920783766.7; 1 pages.
Response to Japanese First Office Action dated May 3, 2013; for Chinese Pat. App. No. 200920783766.7; 9 pages.
Letter from NTD Patent and Trademark Agency dated Feb. 6, 2013; for Chinese Pat. App. No. 200920783766.7; 2 pages.
Japanese Second Office Action dated Jan. 18, 2013; for Chinese Pat. App. No. 200920783766.7; 8 pages.
Letter to NTD Patent and Trademark Agency dated Feb. 6, 2013; for Chinese Pat. App. No. 200920783766.7; 2 pages.
Letter from NTD Patent and Trademark Agency dated Mar. 21, 2013; for Chinese Pat. App. No. 200920783766.7; 1 page.
Response to Japanese Second Office Action (with English translation) dated Jan. 18, 2013; for Chinese Pat. App. No. 200920783766.7; 7 pages.
Chinese Notice of Completing Formalities for Patent Registration (with English translation), dated Mar. 6, 2013; for Chinese Pat. App. No. 200920783766.7; 4 pages.
Letter from Yuasa and Hara dated Aug. 16, 2013; for Japanese Pat. App. No, 2011-539582; 3 pages.
Japanese Notice of Reasons for Rejection; dated Jul. 16, 2013; for Japanese Pat. App. No. 2011-539582; 3 pages.
EP Official Communication; dated Feb. 23, 2012; for EP Pat. App. No. 10739429.8; 2 pages.
Response to EP Official Communication dated Feb. 23, 2012 for EP Pat. App. No. 10739429.8; filed on Sep. 4, 2012, 21 pages.
European Decisiion to Grant Patent dated Sep. 5, 2013; for European Pat. App. No. 10739429.8; 2 pages.
PCT Search Report dated Nov. 19, 2003 for PCT Pat. App. No. PCT/US03/02489; 5 pages.
PCT Search Report for PCT/US2006/000363 dated May 11, 2006.
PCT International Preliminary Report and Written Opinion on Patentability of the ISA dated Aug. 7, 2007; for PCT/US2006/000363; 9 pages.
PCT Search Report and Written Opinion of the ISA for PCT/US2008/053551; dated Jul. 15, 2008; 11 pages.
PCT International Preliminary Report on Patentability and Written Opinion for PCT/US2008/053551; dated Oct. 8, 2009; 7 pages.

(56) References Cited

OTHER PUBLICATIONS

PCT Search Report of the ISA for PCT/US2009/031776 dated Oct. 23, 2009.
PCT International Preliminary Report on Patentability and Written Opinion dated Sep. 10, 2010 for PCT/US2009/031776.
PCT Search Report of the ISA for PCT/US2009/048237 dated Aug. 25, 2009; 2 pages.
PCT International Preliminary Report on Patentability and Written Opinion for PCT/US2009/048237 dated Feb. 10, 2011, 8 pages.
European Response to Written Opinion dated Apr. 18, 2011; for European Pat. App. No. 09789890.2; 11 pages.
PCT Search Report and Written Opinion for PCT/US2009/065044 dated Jan. 7, 2010; 11 pages.
PCT International Preliminary Report on Patentability and Written Opinion of the ISA; dated Jun. 7, 2011; for PCT Pat. App. No. PCT/US2009/065044; 7 pages.
PCT Search Report and Written Opinion of the ISA for PCT/US2010/024256 dated Aug. 11, 2010; 11 pages.
Amendment under PCT Article 19 filed on Oct. 5, 2010 in PCT/US2010/024256; 18 pages.
PCT International Preliminary Report on Patentability and Written Opinion of the ISA dated Sep. 1, 2011; for PCT Pat. App. No. PCT/US2010/024256; 9 pages.
PCT Search Report and Written Opinion of the ISA for PCT/US2010/042694 dated Sep. 27, 2010; 13 pages.
PCT International Preliminary Report on Patentability and Written Opinion of the ISA; dated Feb. 2, 2012; for PCT Pat. App. No. PCT/US2010/042694; 11 pages.
European Search Report dated Jul. 4, 2011; for European Pat. App. No. 13169661.9; 11 pages.
PCT Search Report and Written Opinion of the ISA for PCT Pat. App. No. PCT/US2012/032315; dated Jun. 22, 2012; 16 pages.
PCT Search Report and the Written Opinion of the ISA dated Jul. 17, 2013; for PCT/US2013/037065; 13 pages.
Non-final office action dated Jan. 26, 2018 for U.S. Appl. No. 15/655,135; 50 pages.
A.A. Thornton response to official communication dated May 22, 2017 and filed on Nov. 17, 2017 regarding Div. EP Patent Application No. 16192498.0; 7 pages.
Amended Claims in response to official communication filed on Nov. 17, 2017 regarding Div. EP Patent Application No. 16192498.0; 7 pages.
Response to U.S. Non-Final Office Action dated Jan. 26, 2018 for U.S. Appl. No. 15/655,135; Response filed Apr. 3, 2018; 20 pages.
Final Office Action dated Jul. 26, 2018 for U.S. Appl. No. 15/655,135; 38 Pages.
Response to Final Office Action dated Jul. 26, 2018 for U.S. Appl. No. 15/655,135, filed Oct. 11, 2018; 21 Pages.

* cited by examiner

ARRANGEMENTS FOR MAGNETIC FIELD SENSORS TO CANCEL OFFSET VARIATIONS

CROSS REFERENCE TO RELATED APPLICATIONS

Not Applicable.

STATEMENT REGARDING FEDERALLY SPONSORED RESEARCH

Not Applicable.

FIELD

This invention relates generally to magnetic field sensors, and, more particularly, to magnetic field sensors having a magnet and a substrate with magnetic field sensing elements thereupon, all arranged in a variety of relative positions and all acting as movement detectors.

BACKGROUND

Various types of magnetic field sensing elements are known, including Hall Effect elements and magnetoresistance elements. Magnetic field sensors generally include a magnetic field sensing element and other electronic components. Some magnetic field sensors also include a permanent magnet in a so-called "back biased" arrangement described more fully below.

Magnetic field sensors provide an electrical signal representative of a sensed magnetic field. In some embodiments that have the magnet in a so-called back-biased arrangement, a magnetic field sensed by a magnetic field sensor is a magnetic field generated by the magnet. In these back-biased arrangements, in the presence of a moving ferromagnetic object, the magnetic field generated by the magnet and sensed by the magnetic field sensor varies in accordance with a shape or profile of the moving ferromagnetic object.

In some arrangements, the ferromagnetic object that is sensed can have teeth, as in gear teeth upon a gear. With these arrangements, passing gear teeth are sensed and by the magnetic field sensor, a rate of which can be indicative of a speed of rotation of the gear. An output signal from the magnetic field sensor can indicate the speed of the rotation.

With some arrangements, the output signal from the magnetic field sensor can also indicate a direction of the rotation.

Where the gear is attached to a target object, for example, a shaft, the output signal from the magnetic field sensor can be indicative of the speed of rotation of the target object and/or the direction of rotation of the target object.

Magnetic field sensing elements, e.g., Hall effect elements, can be used to sense the varying magnetic field in response to passing ferromagnetic object, e.g., a rotating gear. In some arrangements, a relative phase of signals generated by two or more of the magnetic field sensing elements is used to detect the direction of rotation of the ferromagnetic object, e.g., the gear. Thus, it will be apparent that a small relative phase difference, particularly in the presence of electrical or magnetic noise, can result in errors in the detection of the direction of rotation.

It would be desirable to provide a magnetic field sensor in a back-biased arrangement that can achieve an output signal that accurately differentiates between two directions of rotation of a ferromagnetic object to provide a detected direction, with reduced susceptibility to errors in the detected direction.

SUMMARY

The present inventions provides a magnetic field sensor and associate method in a back-biased arrangement that can achieve an output signal that accurately differentiates between two directions of rotation of a ferromagnetic object, or directions of any movement of a ferromagnetic object, to provide a detected direction, with reduced susceptibility to errors in the detected direction.

In accordance with an example useful for understanding an aspect of the present invention, a magnetic field sensor can sense a movement of an object along a path, a movement line tangent to the path. The magnetic field sensor can include a magnet, the magnet comprising a north pole, a south pole, and a magnet axis passing through the north pole and the south pole. The magnetic field sensor can also include a semiconductor substrate proximate to the magnet and at a position between the object and the magnet planar surface, the semiconductor substrate having first and second major opposing surfaces, the magnet axis substantially perpendicular to the first opposing surface of the semiconductor substrate, the semiconductor substrate having first and second orthogonal axes on the first opposing surface of the substrate intersecting at a substrate point on the first surface of the substrate, wherein the magnet axis intersects the substrate point, wherein a projection of the movement line onto the first opposing surface of the semiconductor substrate is substantially parallel to the first orthogonal axis on the first surface of the substrate. The magnetic field sensor can also include a first magnetic field sensing element disposed on or under the first surface of the semiconductor substrate, wherein the first magnetic field sensing element comprises an axis of maximum sensitivity substantially parallel to the first opposing surface of the substrate and substantially parallel to the first orthogonal axis. The magnetic field sensor can also include a second magnetic field sensing element, wherein the second magnetic field sensing element comprises an axis of maximum sensitivity substantially parallel to the first opposing surface of the substrate and substantially parallel to the second orthogonal axis. The magnetic field sensor can also include a third magnetic field sensing element disposed on or under the first surface of the semiconductor substrate, wherein the third magnetic field sensing element comprises an axis of maximum sensitivity substantially parallel to the first opposing surface of the substrate and substantially parallel to the first orthogonal axis. The magnetic field sensor can also include a fourth magnetic field sensing element disposed on or under the first surface of the semiconductor substrate, wherein the fourth magnetic field sensing element comprising an axis of maximum sensitivity substantially parallel to the first opposing surface of the substrate and substantially parallel to the second orthogonal axis, wherein the first, second, third, and fourth magnetic field sensing elements are disposed away from the substrate point.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
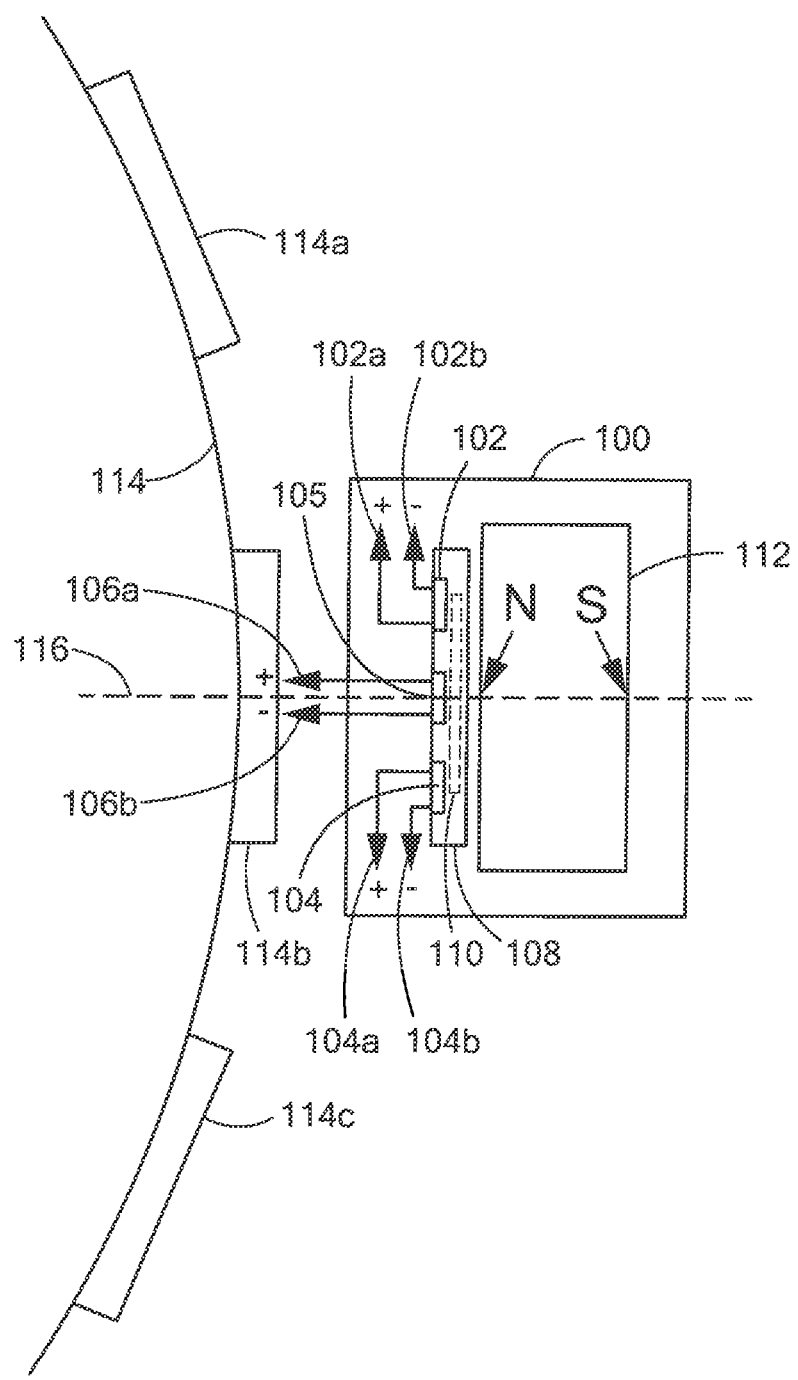
FIG. 1 is a block diagram showing a prior art magnetic field sensor proximate to a gear operable to rotate.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a compound semiconductor material like Gallium-Arsenide (GaAs) or an Indium compound, e.g., Indium-Antimonide (InSb), or InGaA.

As is known, some of the above-described magnetic field sensing elements tend to have an axis of maximum sensitivity substantially parallel to a substrate that supports the magnetic field sensing element, and others of the above-described magnetic field sensing elements tend to have an axis of maximum sensitivity substantially perpendicular to a substrate that supports the magnetic field sensing element. In particular, planar Hall elements tend to have axes of sensitivity substantially perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/−ten degrees.

Examples below describe a particular gear as may be used upon an engine camshaft target object. However, similar circuits and techniques can be used with other cams or gears disposed upon the engine camshaft, or upon other rotating parts of an engine (e.g., crank shaft, transmission gear, anti-lock braking system (ABS)), or upon rotating parts of a device that is not an engine. Other applications may include linear translation sensors or other sensors where the target is not a rotating gear. The gear (or target) is not a part of the magnetic field sensors described below. The gear can have ferromagnetic gear teeth, which can be soft ferromagnetic objects, but which can also be hard ferromagnetic objects, patterns, or domains which may or may not have actual physical changes in their shape.

Also, while examples are shown below of magnetic field sensors that can sense ferromagnetic gear teeth or gear teeth edges upon a gear configured to rotate, the magnetic field sensors can be used in other applications. The other applications include, but are not limited to, sensing ferromagnetic objects upon a structure configured to move linearly.

As used herein, the term "baseline" and the phrase "baseline level" are used to describe a lowest magnitude (which may be near zero or may be some other magnetic field) of a magnetic field experienced by a magnetic field sensing element within a magnetic field sensor when the magnetic field sensor is operating in a system. In some systems, this lowest magnetic field occurs when a magnetic field sensor is proximate to a gear valley as opposed to a gear tooth.

It will be understood that, in general, a difference between the baseline level and a higher level achieved, for example, when a gear tooth is proximate to a magnetic field sensor, is related to an ability of the magnetic field sensor to differentiate between a gear tooth and a valley, and thus, related to accuracy of the magnetic field sensor.

While it is described above that a baseline level is generated when a magnetic field sensor is proximate to a gear valley and a higher level is achieved when the magnetic field sensor is proximate to a gear tooth, other physical arrangements are also possible, for example, a reverse arrangement for which a baseline level is generated when a magnetic field sensor is proximate to a gear tooth and a higher level is achieved when the magnetic field sensor is proximate to a gear valley.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term "active electronic component" is used to describe an electronic component that has at least one p-n junction. A transistor, a diode, and a logic gate are examples of active electronic components. In contrast, as used herein, the term "passive electronic component" as used to describe an electronic component that does not have at least one p-n junction. A capacitor and a resistor are examples of passive electronic components.

Referring now to FIG. 1, an example conventional magnetic field sensor 100 is responsive to a gear 114 having gear teeth, e.g., gear teeth 114a, 114b, 114c. The magnetic field sensor 100 includes three magnetic field sensing elements 102, 104, 106 coupled to an electronic circuit 110 upon a substrate 108. In some embodiments, the magnetic field sensing elements 102, 104 are separated in a direction substantially perpendicular to an axis 116 by a distance between about 1.5 millimeters and about 3.0 millimeters, and the magnetic field sensing element 106 is located midway between the magnetic field sensing elements 102, 104.

The three magnetic field sensing elements 102, 104, 106 and an electronic circuit 110 can be disposed upon (i.e., integrated within or upon) a substrate 108. Here, the magnetic field sensing elements 102, 104, 106 are shown to be planar Hall effect elements. The magnetic field sensor 100 can also include a magnet 112, resulting in a back-biased arrangement. The magnet 112 is configured to generate a magnetic field, which is generally directed along the axis 116 at the position of the magnetic field sensing elements 102, 104, 106.

The electronic circuit 110 is configured to generate an output signal (not shown). An exemplary electronic circuit 110 is described below in conjunction with FIG. 2. Let it suffice here to say that the electronic circuit 110 generates a difference of signals. Thus, the magnetic field sensor 100 is an edge detector and not a tooth detector.

An "edge detector" is not able to identify whether the magnetic field sensor 100 is proximate to a gear tooth or a gear valley. However, the edge detector is able to sense edges of gear teeth as they move past the magnetic field sensor 350. In contrast, a "tooth detector" is able to identify whether a magnetic field sensor is proximate to a gear tooth or valley.

The output signal, when the gear 114 is rotating, is indicative speed of rotation of the gear 114 and can also be indicative of a direction of rotation of the gear 114 by circuits and techniques described more fully below.

In some embodiments, the magnet 112 can have a central core (not shown). The central core (not shown) can be comprised of a soft ferromagnetic material disposed within the magnet 112. An example of a magnet with a core is described in U.S. Pat. No. 6,278,269, entitled "Magnet Structure," issued Aug. 21, 2001, which patent is assigned to the assignee of the present invention and incorporated herein by reference in its entirety. As described in U.S. Pat. No. 6,278,269, the pole configuration provided by the magnet with the core lowers the base field (or baseline) of a flux density of the magnetic field at some points above the surface of the core (e.g., to the left of the magnet 112 as shown) when a valley of the gear 114 is proximate to the magnetic field sensor 100. A predetermined baseline (e.g., within a range of about +/six hundred Gauss) at the magnetic field sensing elements 102, 104, 106, can be achieved with proper design.

The above-described low baseline, which occurs when the magnetic field sensor is proximate to a gear valley, results in the electronic circuit 110 being able to identify gear teeth as they pass by the magnetic field sensor 100.

As described above, the central core can result in a low baseline when the magnetic field sensing element 102, 104, 106 are proximate to a valley in the gear 114. However, the magnetic field sensor 100 uses three magnetic field sensing elements, generating a respective three differential output signals 102a, 102b, and 104a, 104b, and 106a, 106b. As will be described in conjunction with FIG. 2, pairs of signals representative of the three differential output signals 102a, 102b, and 104a, 104b, and 106a, 106b are subtracted in the electronic circuit 110. Thus, when the three magnetic field sensing elements 102, 104, 106 are proximate to a valley in the gear 114, the differential nature of the combined signal can result in an even lower combined signal than can achieved by the low baseline alone. Also, when the three magnetic field sensing elements 102, 104, 106 are proximate to a gear tooth, the low combined signal is also achieved. Only when some of the magnetic field sensing elements 102, 104, 106 are proximate to a gear tooth and others are proximate to a gear valley, i.e., proximate to a gear edge, is the combined signal increased. Thus, the magnetic field sensor 100 is an edge detector, and not a tooth detector.

The differencing of pairs of the three differential signals 102a, 102b, and 104a, 104b, and 106a, 106b results in an improved accuracy of the magnetic field sensor 100. For example, the magnetic field sensor 100 is less influenced by external magnetic fields, i.e., noise magnetic fields and/or by nose electromagnetic field, i.e., by noise electrical signals, that the three magnetic field sensing elements 102, 104, 106 may experience in the same way.

Figure 2:
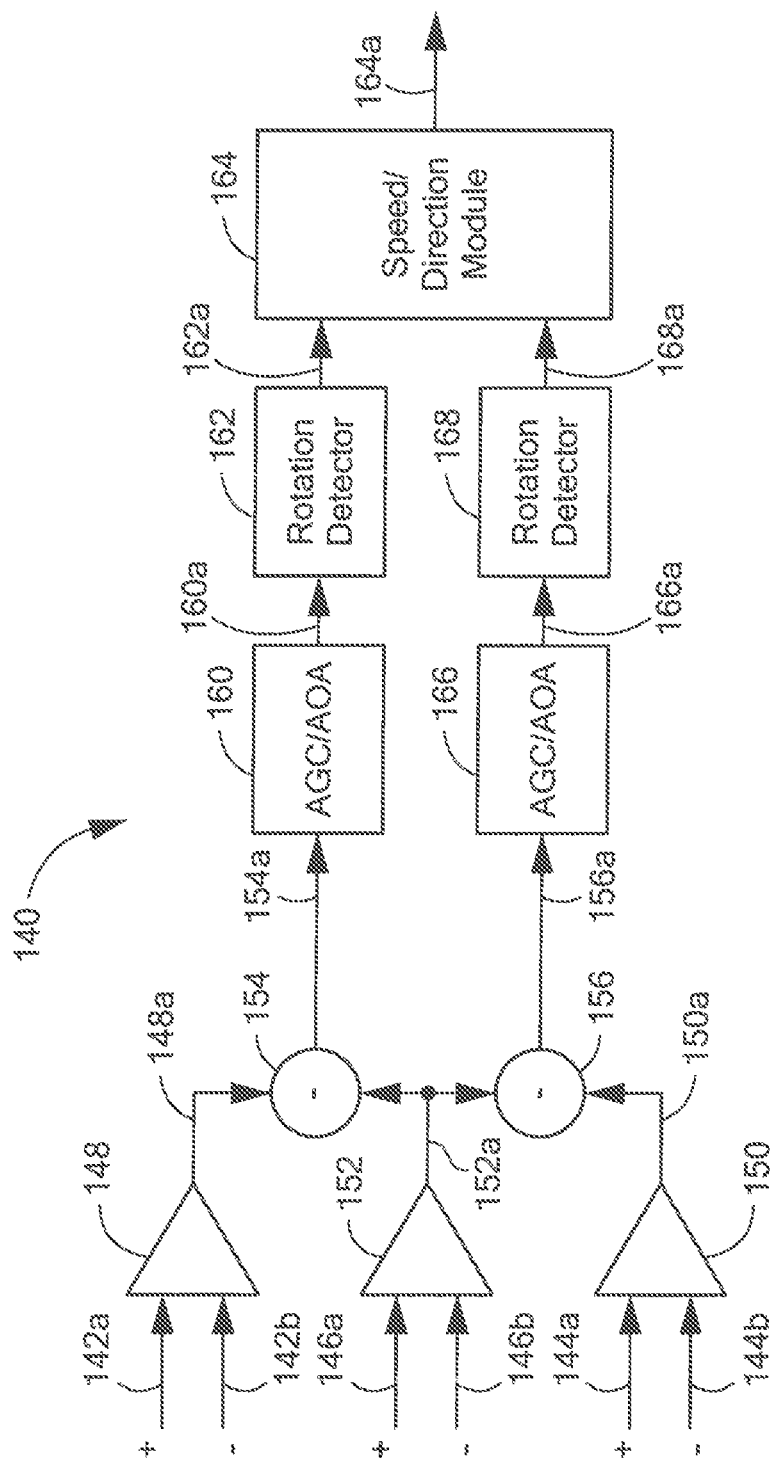
FIG. 2 is a block diagram showing a prior art electronic circuit that can be used in the prior art magnetic field sensor of FIG. 1.

Referring now to FIG. 2, a conventional electronic circuit 140 can include amplifiers 148, 150, 152 coupled to receive differential signals 142a, 142b, and 144a, 144b, and 146a, 146b, respectively. The differential signal 142a, 142b can be the same as or similar to the differential signal 102a, 102b, the differential signal 144a, 144b can be the same as or similar to the differential signals 104a, 104b, and the differential signal 146a, 146b can be the same as or similar to the differential signal 106a, 106b generated, respectively, by the magnetic field sensing elements 102, 104, 106 of FIG. 1. The amplifiers 148, 150, 152 are configured to generate amplified signals 148a, 150a, 152a, respectively.

The amplified signals 148a, 152a are received by a first differencing module 154, which is configured to generate a first difference signal 154a. The amplified signals 150a, 152a are received by a second differencing module 156, which is configured to generate a second difference signal 156a.

The electronic circuit 140 can include a first automatic gain control/automatic offset control (AGC/AOA) module 160 coupled to receive the first difference signal 154a. The electronic circuit 140 can include a second automatic gain control/automatic offset control (AGC/AOA) module 166 coupled to receive the second difference signal 156a.

The first AGC/AOA module 160 is operable to generate a first calibrated signal 160a and the second AGC/AOA module 166 is operable to generate a second calibrated signal 166a. The calibrated signals 160a 166a can have signal values adjusted in gain so that AC signal components thereof can match in amplitude, and signal values for which DC offset signal components thereof are substantially removed.

A first rotation detector module 162a is coupled to receive the first calibrated signal 160a and a second rotation detector 168 is coupled to receive the second calibrated signal 166a.

Generally speaking, the rotation detector modules 162, 166 are operable to convert the calibrated signals 160a, 166a from multi-state signals, e.g., analog sinusoid signals, to two-state signals 162a, 168a, respectively. This conversion can be accomplished, for example, by comparing the first calibrated signal 160a with one or more threshold values to generate the first two-state signal 162a and comparing the second calibrated signal 166a with another one or more threshold values to generate the second two-state signal 168a.

A variety of ways have been used to generate the above-described threshold values. For example, in one type of magnetic field sensor described in U.S. Pat. No. 6,525,531, issued Feb. 25, 2003, a positive digital-to-analog converter (PDAC) and a negative digital-to-analog converter (NDAC) track positive and negative peaks of magnetic field signal, respectively, for use in generating a threshold signal. A varying magnetic field signal is compared to the threshold signal to generate a two-state signal. Other ways to generate the above-described threshold values are described, for example, in U.S. Pat. No. 7,368,904, issued May 6, 2008, and U.S. Pat. No. 7,253,614, issued Aug. 7, 2007, and U.S. Pat. No. 7,772,838, issued Aug. 10, 2010, all of which are assigned to the assignee of the present invention and both of which are incorporated by reference herein in their entirety.

The two-state signals 162a, 168a each have state transitions, rates of which are indicative of a speed of rotation of the gear 114. The two-state signals 162a, 168a also have a relative phase, one having state transitions that occur before the other or vice versa. A sign (plus or minus) of a relative phase of the two-state signals 162a, 168a is indicative of a direction of rotation of the gear 114.

The sign of the relative phase is most easily determined and least subject to errors caused for example, by magnetic and electrical noise, if the relative phase between the two-state signals 162a, 168a is large. Phase separation between the two state signals 162a, 168a is ultimately determined according to a separation between the magnetic field sensing elements 102, 104 and a speed of rotation of the gear 114. In order to keep the substrate 108 small, it is desirable that the separation between the magnetic field sensing elements 102, 104 is small.

As described above, in some embodiments, the magnetic field sensing elements 102, 104 are separated in a direction substantially perpendicular to the axis 116 by a distance between about 1.5 millimeters and about 3.0 millimeters, and the magnetic field sensing element 106 is located midway between the magnetic field sensing elements 102, 104.

For typical gears, e.g., the gear 104, it can be determined that the relative phase between the two-state signals 162a, 168a tends to be small, for example, in the range of +/−ten to fifteen degrees.

A speed/direction module 164 is coupled to receive the two-state signals 162a, 168a and configured to generate a speed/direction signal 164a representative of at least one of the speed of rotation or the direction of rotation of the gear.

Figure 3:
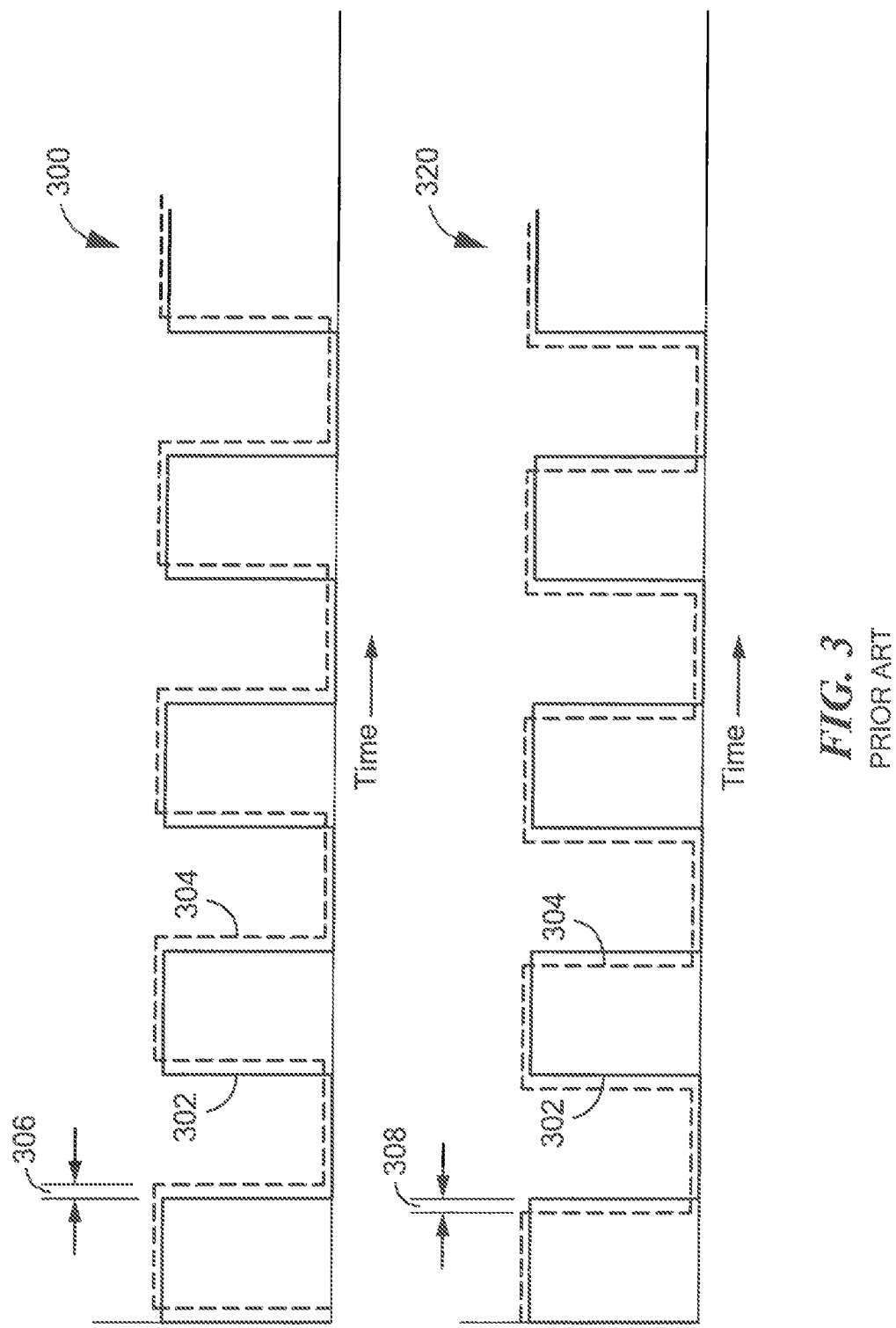
FIG. 3 is a graph showing particular signals within the prior art electronic circuit of FIG. 2.

Referring now to FIG. 3, first and second graphs 300, 320 have horizontal axes with scales in units of time in arbitrary units and vertical axes with scales in units of amplitude in arbitrary units.

In the first graph 300, a first signal 302 is indicative of the first two-state signal 162a of FIG. 2 when the gear 114 is rotating in a first direction, and a second signal 304 is indicative of the second two-state signal 168a of FIG. 2 when the gear 114 is rotating in the first direction. Each edge (state transition) of the signals 302, 304 can be indicative of a gear tooth edge passing by the magnetic field sensor 100.

A phase difference 306 indicates a phase difference when the first and second two-state signals are operating in response to the gear 114 rotating in the first direction.

In the second graph 320, the same first signal 302 is indicative of the first two-state signal 162a of FIG. 2 when the gear 114 is rotating in a second different direction, and the same second signal 304 is indicative of the second two-state signal 168a of FIG. 2 when the gear 114 is rotating in the second direction. Again, each edge (state transition) of the signals 302, 304 can be indicative of a gear tooth edge passing by the magnetic field sensor 100.

A phase difference 308 indicates a phase difference when the first and second two-state signals are operating in response to the gear 114 rotating in the second direction.

It should be apparent that the phase differences 306, 308 have opposite signs. The signs are indicative of the direction of rotation of the gear 114.

In addition, from discussion above in conjunction with FIG. 2, it should be apparent that the phase differences 306, 308 are fairly small and subject to various noises that can result in a detection of the wrong sign of the phase and a corresponding indication of the wrong direction of rotation of the gear 114, either intermittently or statically.

Figure 4:
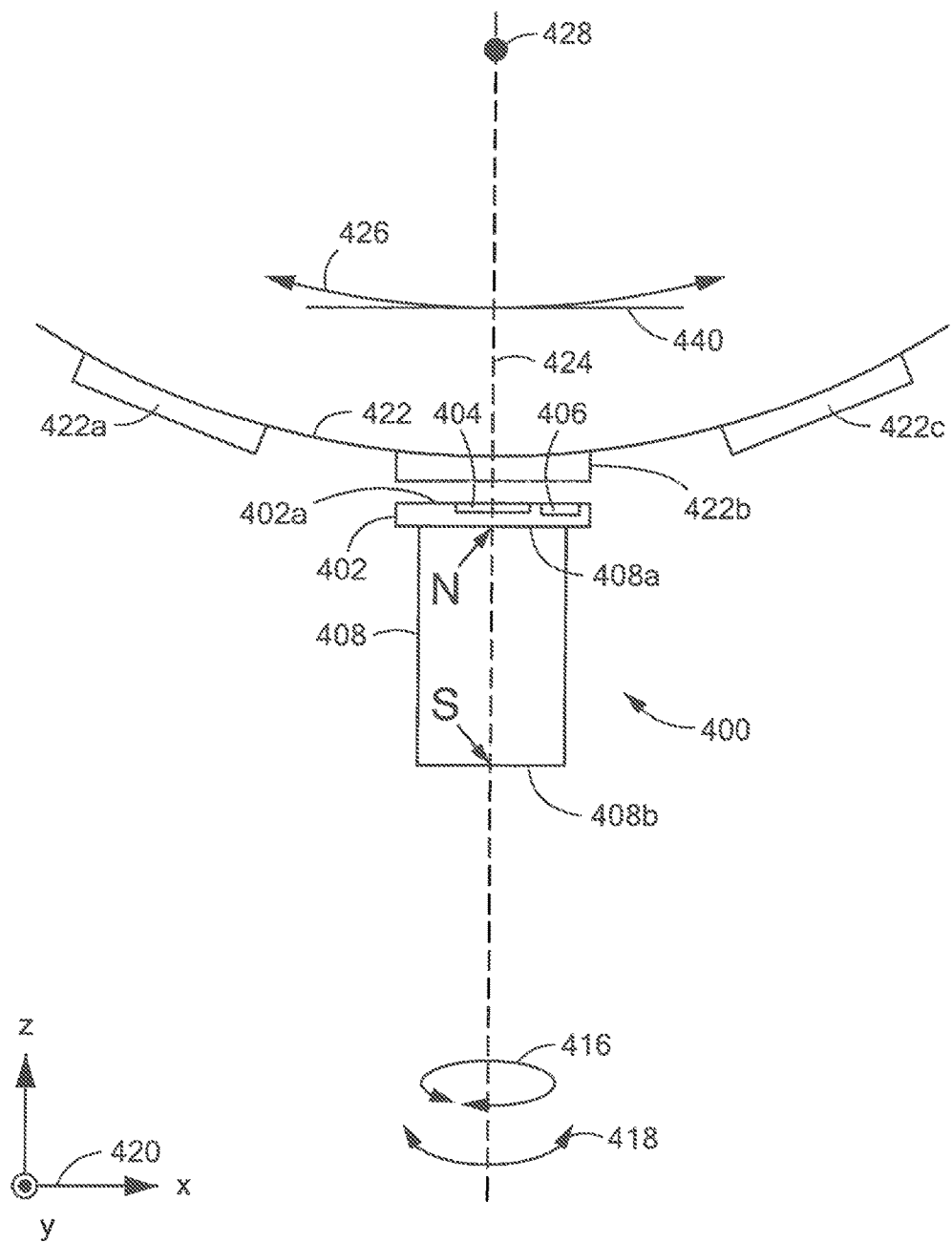
FIG. 4 is a block diagram showing a side view of another magnetic field sensor having a semiconductor substrate proximate to a gear operable to rotate.

Referring now to FIG. 4, an illustrative magnetic field sensor 400 includes a substrate 402 having a first surface 402a, a magnetic field sensing element region 404 having magnetic field sensing elements therein and disposed in or upon the first surface 402a, and an electronic circuit 406 coupled to the magnetic field sensing element region 404 and disposed in or upon the first surface 402a. In some embodiments, the substrate 402 is a semiconductor substrate 402.

Here it is shown that the first surface 402a can be positioned proximate to a ferromagnetic gear 422 having gear teeth 422a, 422b, 422c, and others. However, in other embodiments, the first surface 402a upon which magnetic field sensing elements are disposed in or upon can be positioned in the other direction, distal from the gear 422.

While a rotating gear 422 having ferromagnetic gear teeth, e.g., 422a, is described in examples herein, in other embodiments, an object having ferromagnetic features that move linearly or in some other motion can be used and speed of movement and direction of the movement can be detected with circuits and techniques herein.

The substrate 402 can be disposed substantially parallel to an x-y plane of axes 420.

A magnet 408 can be disposed proximate to the substrate 402 such that a so-called "magnet axis" 424 passes through a north pole 408a, N, and a south pole 408b, S in a direction substantially perpendicular to the surface 402a of the substrate 402. In some embodiments, the axis 424 can also pass though an axis of rotation 428 of the gear. The magnet axis 424 can insect the surfaces 408a, 408b central to the surfaces 408a, 408b.

The magnetic field sensor 400 can rotate in a direction 416 through about +/−thirty degrees while maintaining some accuracy. The magnetic field sensor 400 can also rotate in a direction 418 though about +/−thirty degrees while maintaining some accuracy.

The gear 422 can rotate in a direction 426. A tangent line 440 can be tangent to the rotation direction 426.

Figure 5:
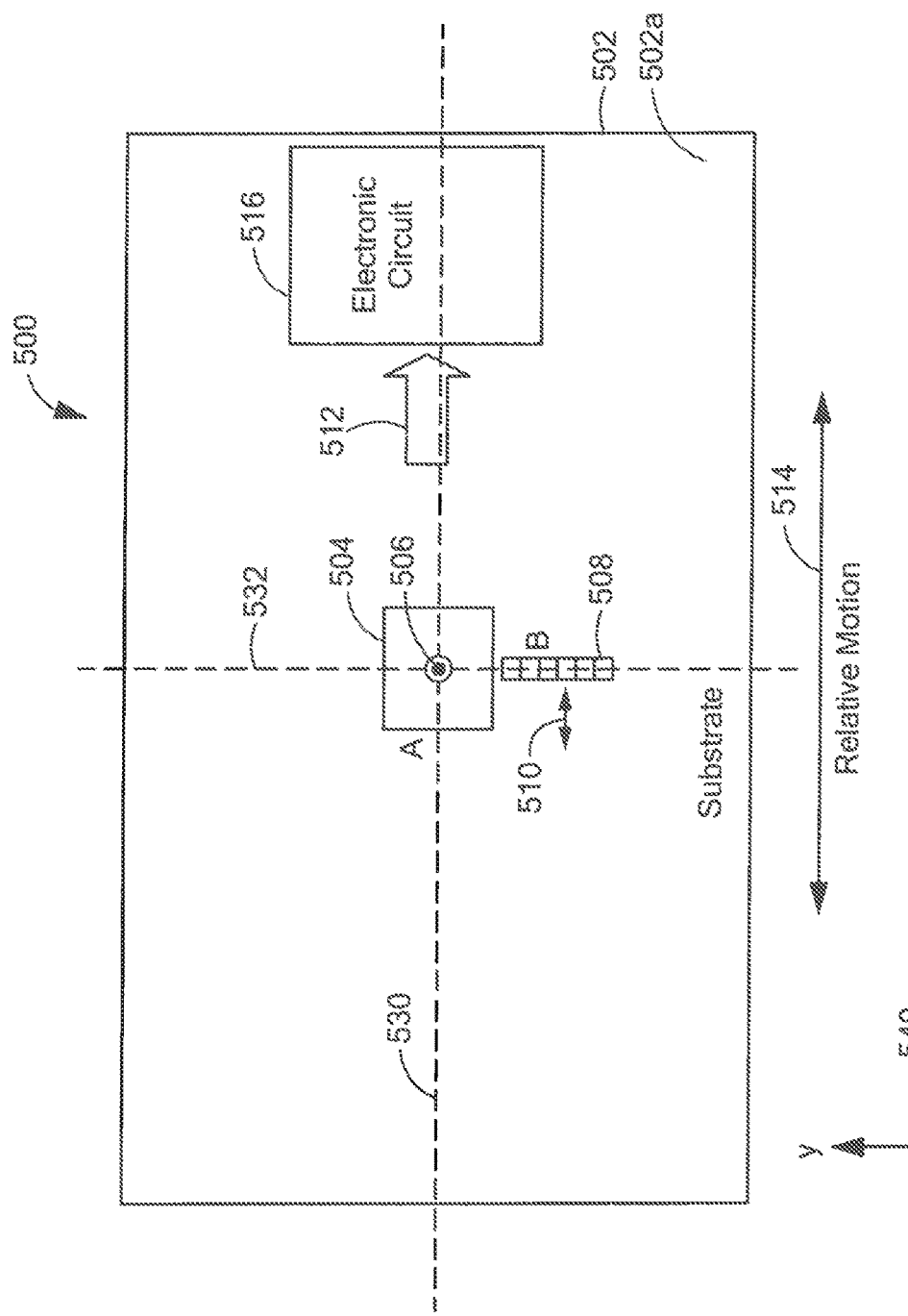
FIG. 5 is a block diagram showing a top view of an illustrative substrate portion of a magnetic field sensor according to FIG. 4 and having two magnetic field sensing elements and an electronic circuit.

Now referring to FIG. 5, a substrate portion of a magnetic field sensor 500 can include a substrate 502 the same as or similar to the substrate 402 of FIG. 4. The substrate 502 can be disposed parallel to the same x-y plane of coordinate axes 540 as indicated by the coordinate axes 420 of FIG. 4

A surface 502a of the substrate 502 can be the same as or similar to the surface 402a of the substrate 402 of FIG. 4.

An electronic circuit 516 can be disposed in or upon the surface 502a of the substrate 502. The electronic circuit 516 can be the same as or similar to the electronic circuit 406 of FIG. 4.

A first magnetic field sensing element 504 and a second magnetic field sensing element 508 can be the same as or similar to magnetic field sensing elements in the magnetic field sensing element region 404 of FIG. 4

A ferromagnetic object can move with a direction substantially parallel to a line 514, which can be, for example, representative of a line substantially parallel to the tangent line 440 of FIG. 4. The ferromagnetic object can move directly over the substrate point at which the orthogonal axes 530, 532 intersect.

The first magnetic field sensing element 504 can be a planar Hall effect element 504 (also sometimes referred to as a horizontal Hall effect element). As described above, the planar Hall effect element 504 has an axis of maximum sensitivity 506 substantially parallel to a z-axis of coordinate axes 540. The axis of maximum sensitivity 506 is substantially perpendicular to the surface 502a of the substrate.

In contrast, the second magnetic field sensing element 508 can be a vertical Hall effect element 508. As described above, the vertical Hall effect element 508 has an axis of maximum sensitivity 510 substantially parallel to the x-axis of the coordinate axes 540, i.e., substantially parallel to the surface 502a of the substrate. The maximum response axis 506 can be substantially perpendicular to the maximum response axis 510.

Electronic signals 512, described more fully below, couple the first and second magnetic field sensing elements 504, 508 to the electronic circuit 516.

A magnet (not shown) can be disposed under the substrate 502 and can have the same orientation and characteristics described below in conjunction with the magnet 408 of FIG. 4.

First and second orthogonal axes 530, 532, respectively, substantially parallel to the first surface 502a of the substrate 502, are indicative of examples of relative placements of the first and second magnetic field sensing elements 504, 508, and also indicative of an example of a relative position of the magnet 408 of FIG. 4. The axis 424 of the magnet can intersect in a z direction (see coordinate axes 540) at an intersection of the first and second orthogonal axes 530, 532, the intersection also referred to herein as a "substrate point." The first and second magnetic field sensing elements 504, 508 can be disposed along the first or second orthogonal axes 530, 532.

A center of the first magnetic field sensing element 504 can be disposed along the first orthogonal axis 530. In some embodiments, the center of the first magnetic field sensing element 504 can be disposed at the intersection of the first and second coordinate axes 530, 532.

A center of second magnetic field sensing element 508b can be disposed along the first or second orthogonal axis 530, 540, here shown to be along the second orthogonal axis 532. However, other placements of the second magnetic field sensing element 508 are also possible.

Figure 6:
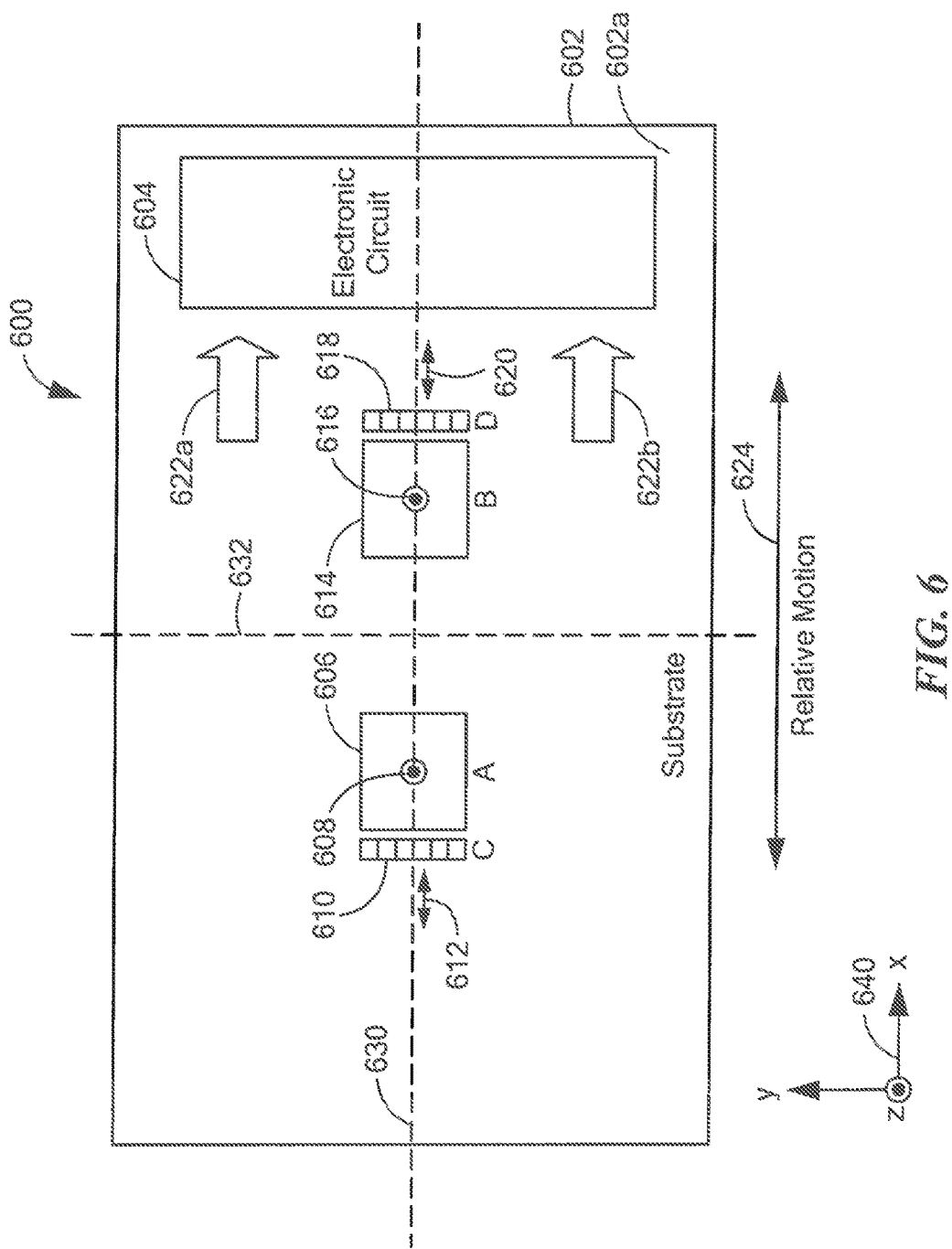
FIG. 6 is a block diagram showing a top view of an illustrative substrate portion of a magnetic field sensor according to FIG. 4 and having four magnetic field sensing elements and an electronic circuit.

Referring now to FIG. 6, a substrate portion of a magnetic field sensor 600 can include a substrate 602 the same as or similar to the substrate 402 of FIG. 4. The substrate 602 can be disposed parallel to the same x-y plane of coordinate axes 640 as indicated by the coordinate axes 420 of FIG. 4

A surface 602a of the substrate 602 can be the same as or similar to the surface 402a of the substrate 402 of FIG. 4.

An electronic circuit 604 can be disposed in or upon the surface 602a of the substrate 602. The electronic circuit 604 can be the same as or similar to the electronic circuit 406 of FIG. 4.

A first magnetic field sensing element 606, a second magnetic field sensing element 610, a third magnetic field sensing element 614, and a fourth magnetic field sensing element 618 can be the same as or similar to magnetic field sensing elements in the magnetic field sensing element region 404 of FIG. 4

A ferromagnetic object (not shown) can move with a direction substantially parallel to a line 624, which can be, for example, representative of a line substantially parallel to the tangent line 440 of FIG. 4. The ferromagnetic object can move directly over the substrate point at which the orthogonal axes 630, 632 intersect.

The first magnetic field sensing element 606 and the third magnetic field sensing element 614 can be planar Hall effect elements 606, 614 (also sometimes referred to as horizontal Hall effect elements). As described above, the planar Hall effect element 606 and has an axis of maximum sensitivity 608 and the planar Hall effect element 614 has an axis of maximum sensitivity 616, both substantially parallel to a z-axis of coordinate axes 540. The axes of maximum sensitivity 608, 616 are substantially perpendicular to the surface 602a of the substrate 602.

In contrast, the second magnetic field sensing element 610 and the fourth magnetic field sensing element 618 can be vertical Hall effect elements 610, 618. As described above, the vertical Hall effect elements 610, 618 have respective axes of maximum sensitivity 612, 620 substantially parallel to the x-axis of the coordinate axes 640, i.e., substantially parallel to the surface 602a of the substrate. The maximum response axes 608, 616 can be substantially perpendicular to the response axes 612, 620.

Electronic signals 622a, 622b, described more fully below, couple the first, second, third and fourth magnetic field sensing elements 606, 610, 614, 618, respectively, to the electronic circuit 604

A magnet (not shown) can be disposed under the substrate 602 and can have the same orientation and characteristics described below in conjunction with the magnet 408 of FIG. 4.

First and second orthogonal axes 630, 632, respectively, substantially parallel to the first surface 602a of the substrate 602, are indicative of examples of relative placements of the first, second, third and fourth magnetic field sensing elements 606, 610, 614, 618, respectively, and also indicative of an example of a relative position of the magnet 408 of FIG. 4. The axis 424 of the magnet can intersect in a z direction (see coordinate axes 640) at an intersection of first and second orthogonal axes 630, 632, the intersection also referred to herein as a "substrate point." The first, second, third, and fourth magnetic field sensing elements 608, 610, 614, 618, respectively, can be disposed along the first or second orthogonal axes 630, 632 and can also be disposed apart from the substrate point.

Centers of the first and third magnetic field sensing elements 606, 614, respectively, can be disposed along the first orthogonal axis 630. In some embodiments, a midpoint between centers of the first and third magnetic field sensing elements 606, 614, respectively, can be disposed at the intersection of the first and second coordinate axes 630, 632.

Centers of second and fourth magnetic field sensing elements 610, 618, respectively, can be disposed along the first or second orthogonal axis 630, 632, here shown to be along the first orthogonal axis 630. In some embodiments, a midpoint between centers of the second and fourth magnetic field sensing elements 610, 618, respectively, can be disposed at the intersection of the first and second coordinate axes 630, 632. However, other placements of the second and fourth magnetic field sensing elements 610, 618 are also possible.

Figure 7:
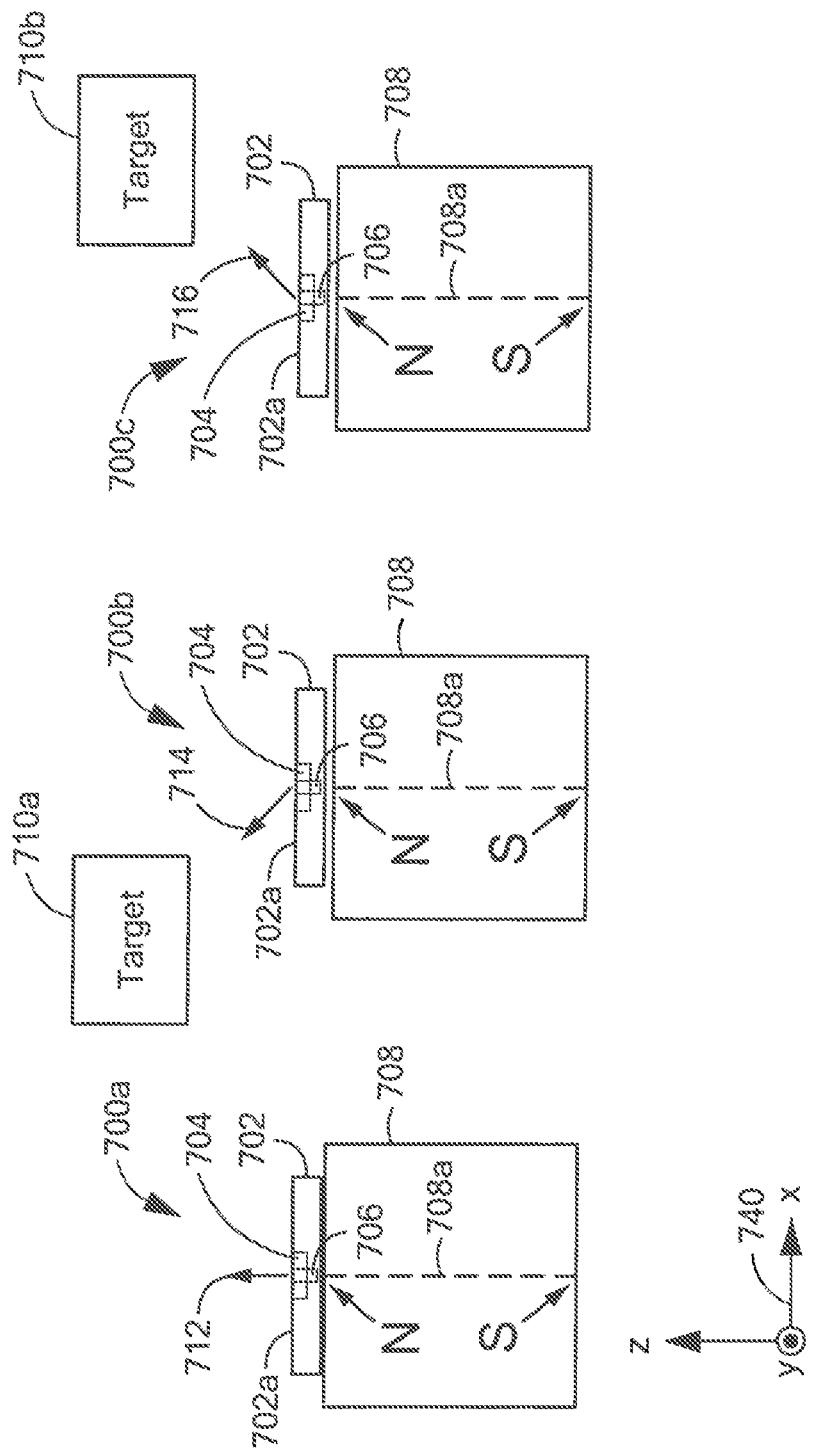
FIG. 7 is a block diagram showing a side view of a magnetic field sensor according to the substrate portion of the magnetic field sensor of FIG. 5 and showing an effect upon magnetic field lines as a ferromagnetic object passes.

Referring now to FIG. 7, shown in three views 700a, 700b, 700c, a magnetic field sensor 700 has a substrate 702 that is the same as or similar to the substrate 502 of FIG. 5. A planar Hall effect element 704 is the same as or similar to the planar Hall effect element 506 of FIG. 5. A vertical Hall effect element 706 is the same as or similar to the vertical Hall effect element 508 of FIG. 5. A magnet 708 is the same as or similar to the magnet 408 of FIG. 4. An axis 708a is the same as or similar to the magnet axis 424 of FIG. 4, passing between north and south poles of the magnet 708.

A ferromagnetic target 710 (here shown at two positions 710a, 710b) is shown at two positions relative to the views 700b, 700c of the magnetic field sensor 700. In the left view 700a, a ferromagnetic target is far away and not shown. In the center view 700b, a ferromagnetic target 710a is to the left of the view 700b of the magnetic field sensor 700. In the right view 700c, the ferromagnetic target 710b is to the right of the view 700c of the magnetic field sensor 700.

A line of magnetic flux 712 (among many such lines) is substantially parallel to the axis 708a of the magnet 708 in the view 700a when no ferromagnetic object is nearby.

A line of magnetic flux 714 has a head angled to the left as shown in the view 700b when the ferromagnetic target 710a is to the left in the view 700b of the magnetic field sensor 700.

A line of magnetic flux 716 has a head angled to the right as shown in the view 700c when the ferromagnetic target 710b is to the right in the view 700c of the magnetic field sensor 700.

Thus, it can be seen that the magnetic flux changes angle when the ferromagnetic target 710a, 710b passes by the magnetic field sensor 700a, 700b, 700c in a direction substantially parallel to an x-axis of the coordinate axes 740.

It should be apparent that an output signal from the planar Hall effect element 704 has an amplitude responsive to a projection of a sensed magnetic field upon its maximum response axis, i.e., to a projection upon an axis centered with the planar Hall effect element 704 and substantially parallel to the z-axis (i.e., substantially perpendicular to the surface 702a of the substrate 702). It should also be apparent that an output signal from the vertical Hall effect element 704 has an amplitude responsive to a projection of a sensed magnetic field upon its maximum response axis, i.e., to a projection upon an axis centered with the vertical hall effect element 706 and substantially parallel to the x-axis (i.e., substantially parallel to the surface 702a of the substrate 702). Thus, both the planar Hall effect element 704 and the vertical Hall effect element 706 have respective varying output signals as the ferromagnetic target object 710a, 710b passes by in a direction of the x-axis of the coordinate axes 740. Further explanation of operation of the magnetic field sensor 700a, 700b, 700c is given below.

The ferromagnetic target object 710a, 710b can be representative of a gear tooth on a gear, for example, one of the gear teeth, e.g., 422b, on the gear 422 of FIG. 4. However, the ferromagnetic target object 710a, 710b can be representative of any other ferromagnetic target object.

Figure 8:
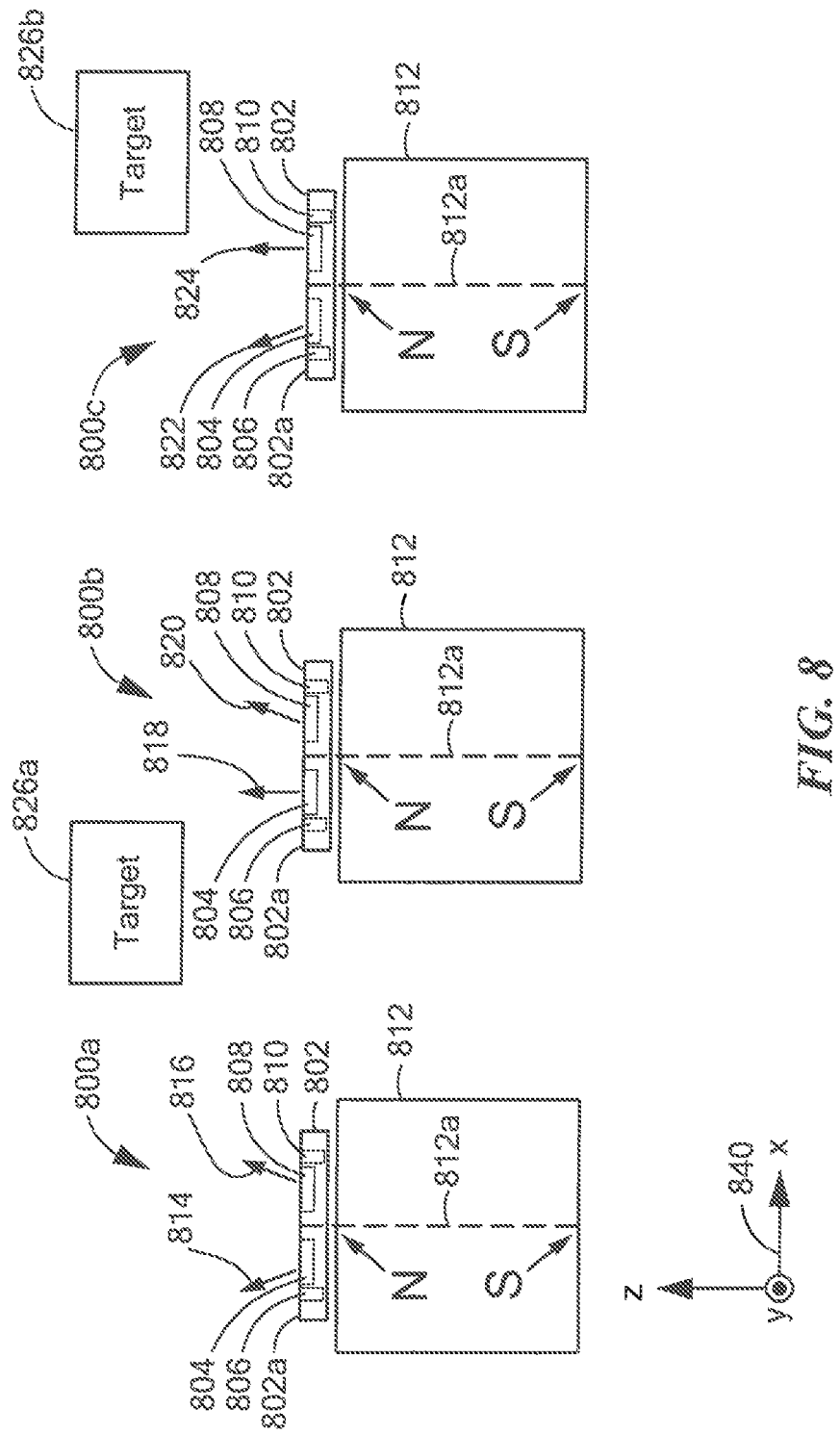
FIG. 8 is a block diagram showing a side view of a magnetic field sensor according to the substrate portion of the magnetic field sensor of FIG. 6 and showing an effect upon magnetic field lines as a ferromagnetic object passes.

Referring now to FIG. 8, shown in three views 800a, 800b, 800c, a magnetic field sensor 800 has a substrate 802 that is the same as or similar to the substrate 502 of FIG. 5. A first magnetic field sensing element 804 comprising a planar Hall effect element 804 is the same as or similar to the first magnetic field sensing element 606 of FIG. 6, i.e., the planar Hall effect element 606 of FIG. 6.

A second magnetic field sensing element 806 comprising a vertical Hall effect element 806 is the same as or similar to the second magnetic field sensing element 610 of FIG. 6, i.e., the vertical Hall effect element 610 of FIG. 6.

A third magnetic field sensing element 808 comprising a planar Hall effect element 808 is the same as or similar to the third magnetic field sensing element 614 of FIG. 6, i.e., the planar Hall effect element 614 of FIG. 6.

A fourth magnetic field sensing element 810 comprising a vertical Hall effect element 810 is the same as or similar to the fourth magnetic field sensing element 618 of FIG. 6, i.e., the vertical Hall effect element 618 of FIG. 6.

A magnet 808 is the same as or similar to the magnet 408 of FIG. 4. An axis 812a is the same as or similar to the magnet axis 424 of FIG. 4, passing between north and south poles of the magnet 808.

A ferromagnetic target 826 (here shown at two positions 826a, 826b) is shown at two positions relative to the views 800b, 800c of the magnetic field sensor 800. In the left view 800a, a ferromagnetic target is far away and not shown. In the center view 800b, a ferromagnetic target 826a is to the left of the view 800b of the magnetic field sensor 800. In the right view 800c, the ferromagnetic target 826b is to the right of the view 800c of the magnetic field sensor 800.

Lines of magnetic flux 814, 816 (among many such lines) have heads symmetrically to the left and to the right, respectively, relative to the axis 812a of the magnet 812 in the view 800a when no ferromagnetic object is nearby.

Lines of magnetic flux 818, 820 have heads in the view 800b such that the line of flux 818 is less angled to the left than the line of magnetic flux 814, when the ferromagnetic target 826a is to the left in the view 800b of the magnetic field sensor 800.

Lines of magnetic flux 822, 824 have heads in the view 800c such that the line of flux 824 is less angled to the right than the line of magnetic flux 816, when the ferromagnetic target 826b is to the right in the view 800c of the magnetic field sensor 800.

Thus, it can be seen that the magnetic flux changes angles when the ferromagnetic target 810a, 810b passes by the magnetic field sensor 800a, 800b, 800c in a direction substantially parallel to an x-axis of the coordinate axes 840.

It should be apparent that respective output signals from the planar Hall effect elements 804, 808 have respective amplitudes responsive to projections of respective sensed magnetic fields upon their respective maximum response axes, i.e., to projections upon axes centered with the planar Hall effect elements 804, 808 and substantially parallel to the z-axis (i.e., substantially perpendicular to the surface 802a of the substrate 802). It should also be apparent that respective output signals from the vertical Hall effect elements 806, 810 have respective amplitudes responsive to projections of respective sensed magnetic fields upon their respective maximum response axes, i.e., to projections upon axes centered with the vertical Hall effect elements 806, 810 and substantially parallel to the x-axis (i.e., substantially parallel to the surface 802a of the substrate 802). Thus, both the planar Hall effect elements 804, 808 and the vertical Hall effect elements 806, 810 have varying output signals as the ferromagnetic target object 826a, 826b passes by in a direction of the x-axis of the coordinate axes 840. Further explanation of operation of the magnetic field sensor 800a, 800b, 800c is given below.

The ferromagnetic target object 826a, 826b can be representative of a gear tooth on a gear, for example, one of the gear teeth, e.g., 422b, on the gear 422 of FIG. 4. However, the ferromagnetic target object 826a, 826b can be representative of any other ferromagnetic target object.

Figure 9:
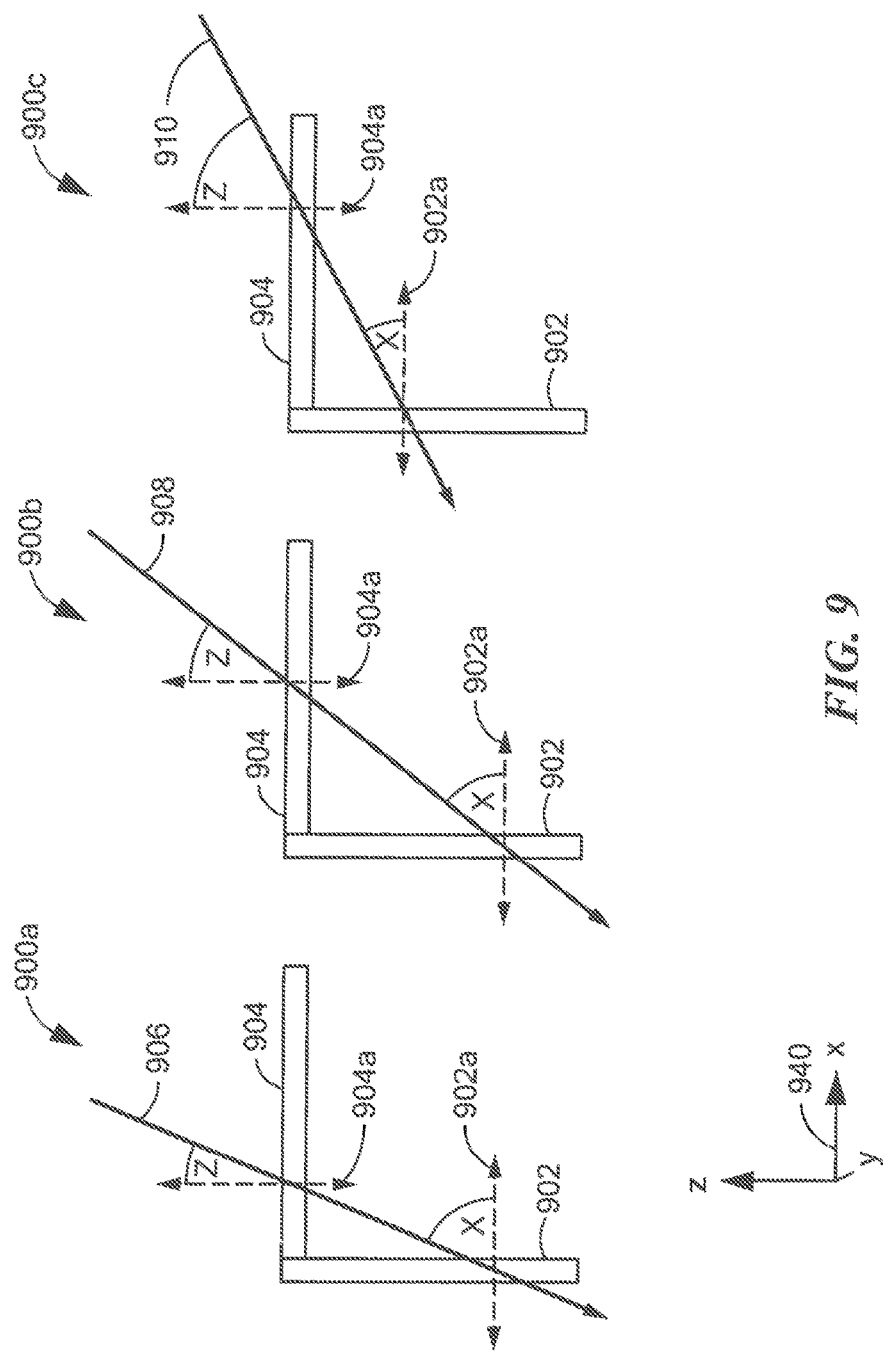
FIG. 9 is a block diagram showing magnetic field lines, planar Hall effect elements, and vertical Hall effect elements.

Referring now to FIG. 9, three views 900as, 900b, 900c show a representation of a vertical Hall effect element 902 with a maximum response axis 902a and a planar Hall effect element 904 with a maximum response axis 904a.

A line of magnetic flux 906 is at a first angle, a line of magnetic flux 908 is at a second angle, and a line of magnetic flux 910 is at a third angle. It should be apparent that the three lines of magnetic flux 906, 908, 910 are representative of lines of magnetic flux that pass through the vertical Hall effect element 902 (e.g., 706, 806, 810) and through the planar Hall effect element 904 (e.g., 704, 804, 808) as the ferromagnetic target objects of FIGS. 7 and 8 pass by respective magnetic field sensor.

The vertical Hall effect element 902 has an axis of maximum sensitivity 902a. The planar Hall effect element 904 has an axis of maximum sensitivity 904a.

The vertical Hall effect element 902 has an output signal proportional to a projection of the magnetic field (906, 908, 910) on the axis of maximum sensitivity 902a. The planar Hall effect element 904 has an output signal proportional to a projection of the magnetic field (906, 908, 910) on the axis of maximum sensitivity 904a. The projections are related to the angles X and Z, respectively, as shown.

It will be apparent that the output signal from the vertical Hall effect element 902 becomes greater in amplitude as the magnetic flux changes from magnetic flux 906 to 908 to 910. Conversely, it will be apparent that the output signal from the planar Hall effect element 904 becomes lesser as the magnetic flux changes from magnetic flux 906 to 908 to 910.

If the magnetic flux were to move back and forth in alternating directions as represented by the views 700a, 700b, 700c and 800a, 800b, 800c as a ferromagnetic object passes by, the output signals from the vertical Hall effect element and the planar Hall effect element would be sinusoids that, within extreme limits, are always ninety degrees apart, regardless of the frequency of the sinusoid, i.e., regardless of the speed of motion of the ferromagnetic object, e.g., regardless of the speed of rotation of the gear 422 of FIG. 4 with ferromagnetic teeth.

Figure 10:
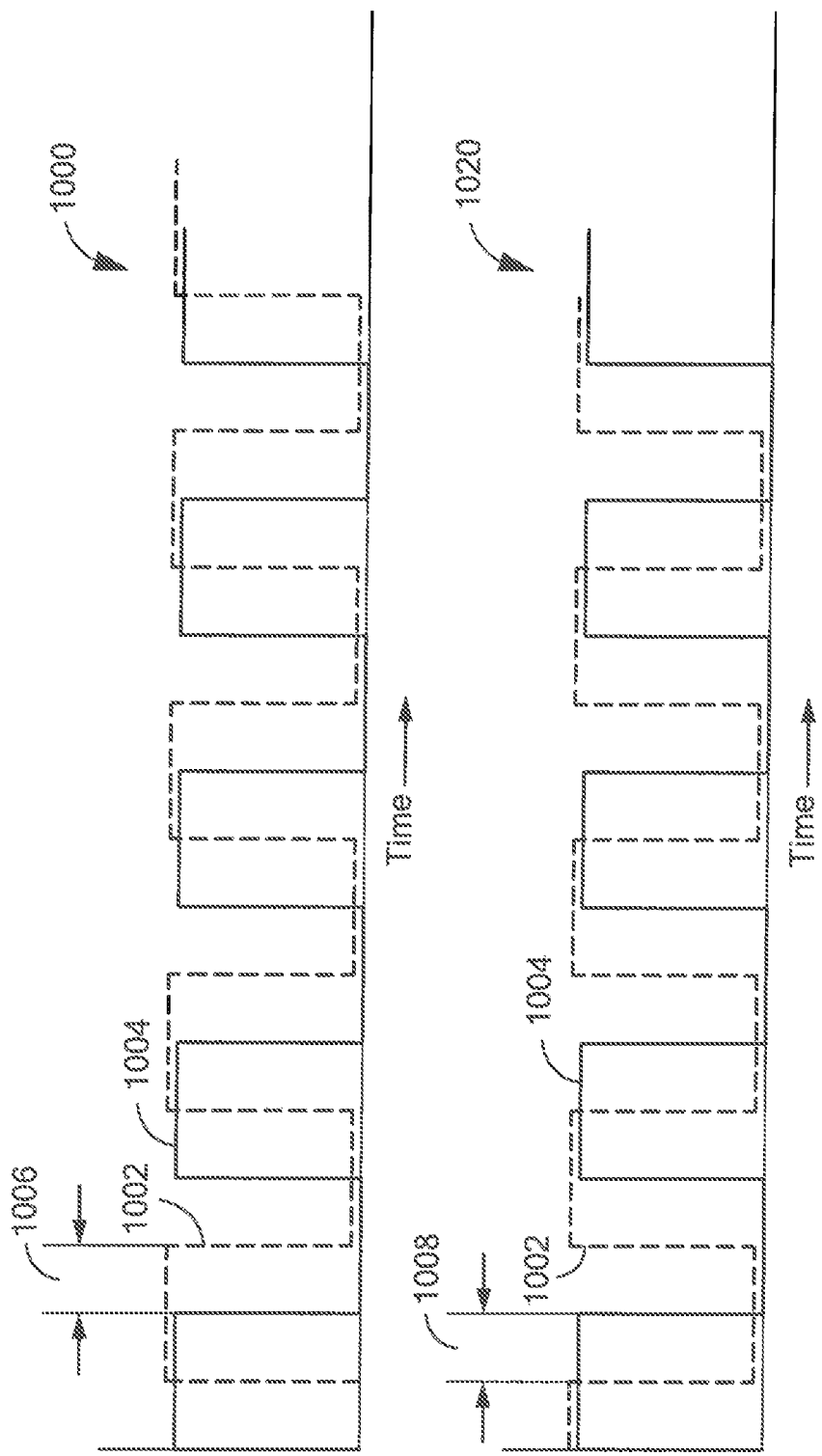
FIG. 10 is a graph showing particular signals within the electronic circuits of FIGS. 5 and 6.

Referring now to FIG. 10, first and second graphs 1000, 1020 have horizontal axes with scales in units of time in arbitrary units and vertical axes with scales in units of amplitude in arbitrary units.

In the first graph 1000, a first signal 1002 is indicative of a first two-state signal described in conjunction with figures below when the gear 422 of FIG. 4 is rotating in a first direction, and a second signal 1004 is indicative of a second two-state signal described in conjunction with figures below when the gear 422 is rotating in the first direction. Each edge (state transition) of the signals 1002, 1004 can be indicative of a gear tooth edge passing by the magnetic field sensor 400 of FIG. 4

A phase difference 1006 indicates a phase difference when the first and second two-state signals are operating in response to the gear 422 rotating in the first direction.

In the second graph 1020, the same first signal 1002 is indicative of the first two-state signal described in conjunction with figures below when the gear 422 is rotating in a second different direction, and the same second signal 1004 is indicative of the second two-state signal described in conjunction with figures below when the gear 422 is rotating in the second direction. Again, each edge (state transition) of the signals 1002, 1004 can be indicative of a gear tooth edge passing by the magnetic field sensor 100.

A phase difference 1008 indicates a phase difference when the first and second two-state signals 1002, 1004 are operating in response to the gear 422 rotating in the second direction.

It should be apparent that the phase differences 1006, 1008 have opposite signs. The signs are is indicative of the direction of rotation of the gear 422.

The phase differences are the result of magnetic field sensor signals described above in FIG. 10 to be ninety degrees apart. Comparing the ninety degree phase differences to the smaller phase difference of FIG. 3, direction detection is much less subject to various noises that can otherwise result in a detection of the wrong sign of the phase and a corresponding indication of the wrong direction of rotation of the gear 422.

The phase separations 1006, 1008 can remain the same for all rotation speed of the gear 422 of FIG. 4

Figure 11:
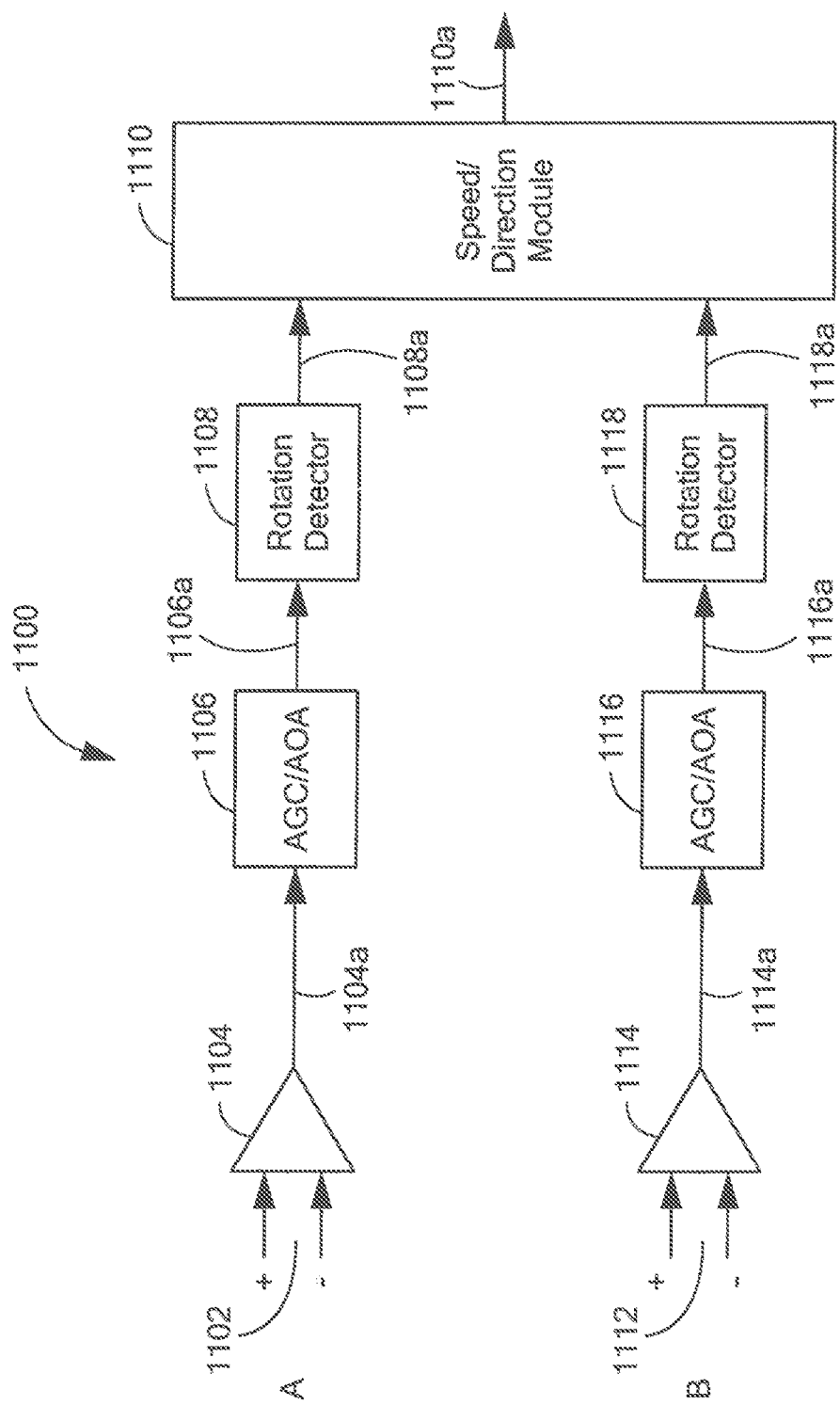
FIG. 11 is a block diagram showing further details of an example of the electronic circuit of FIG. 5.

Referring now to FIG. 11, an electronic circuit 1100 can be the same as the electronic circuit 406 of FIG. 4 when the magnetic field sensor 400 of FIG. 4 includes the substrate portion 500 of FIG. 5, having two magnetic field sensing element 504, 508. The first magnetic field sensing element 504 of FIG. 5 provides a differential signal 1102 and the second magnetic field sensing element 508 provides a differential signal 1112 to amplifiers 1104, 1114, respectively.

In accordance with the discussion above in conjunction with FIGS. 9 and 10, the differential signals 1102, 1112 have a ninety degree phase relationship when the gear 422 of FIG. 4 rotates, for all rotational speeds of the gear 422.

Amplifiers 1104, 1114, are coupled to receive the differential signals 1102, 1112, respectively, and operable to generate amplified signals 1104a, 1114a, which are received by AGC/AOA modules 1106, 1116, respectively.

The AGC/AOA modules 1106 1116, rotation detector modules 1108, 1118, and a speed/direction module 1110 can be the same as and coupled the same way as AGC/AOA modules 160, 166, the rotation detector modules 162, 168, and the speed/direction module 164 of FIG. 2.

Two-state signals 1108a, 1118a have +/−ninety degree phase relationships described above in conjunction with FIG. 10.

The electronic circuit 1100 can provide a so-called "tooth detector" that can sense a presence or absence of proximity of a gear tooth (also valley), even when the gear 422 of FIG. 4 is not rotating.

Figure 12:
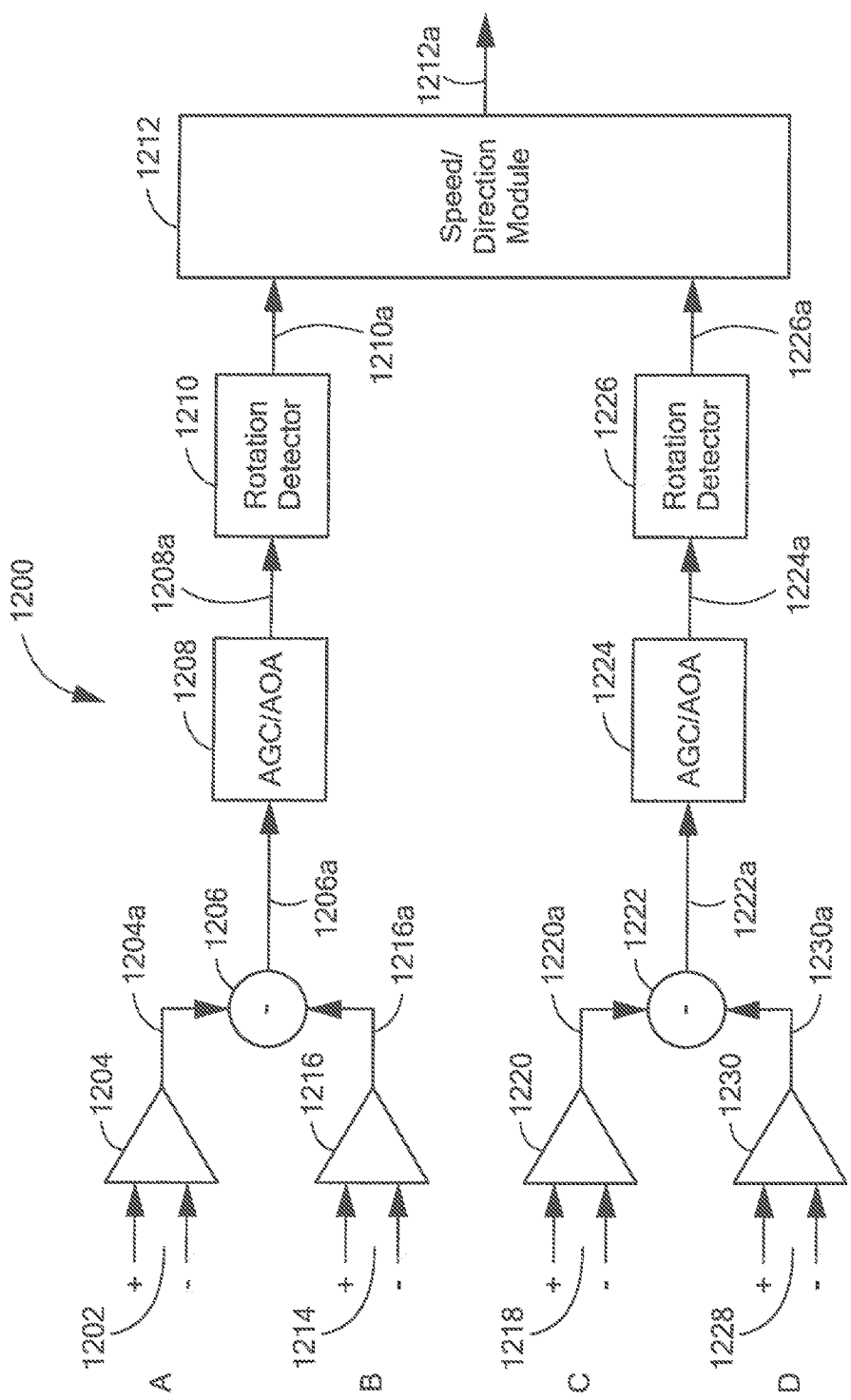
FIG. 12 is a block diagram showing further details of an example of the electronic circuit of FIG. 6.

Referring now to FIG. 12, an electronic circuit 1200 can be the same as the electronic circuit 406 of FIG. 4 when the magnetic field sensor 400 of FIG. 4 includes the substrate portion 600 of FIG. 6, having four magnetic field sensing element 606, 610, 614, 618. The first magnetic field sensing element 606 of FIG. 6 provides a differential signal 1202. The third magnetic field sensing element 614 of FIG. 6 provides a differential signal 1214. The second magnetic field sensing element 610 of FIG. 6 provides a differential signal 1218. The fourth magnetic field sensing element 618 of FIG. 6 provides a differential signal 1228.

Amplifiers 1204, 1216, are coupled to receive the differential signals 1202, 1214, respectively, and operable to generate amplified signals 1204a, 1216a. A differencing module 1206 can be coupled to receive the amplified signals 1204a, 1216a and operable to generate a first difference signal 1206a.

Amplifiers 1220, 1230, are coupled to receive the differential signals 1218, 1228, respectively, and operable to generate amplified signals 1220a, 1230a. A differencing module 1222 can be coupled to receive the amplified signals 1220a, 1230a and operable to generate a second difference signal 1222a.

In accordance with the discussion above in conjunction with FIGS. 9 and 10, the difference signals 1206a, 1222a have a ninety degree phase relationship when the gear 422 of FIG. 4 rotates, for all rotational speeds of the gear 422.

AOA/AGC modules 1208, 1224 are coupled to receive the first and second difference signals 1206a, 1222a. The AGC/AOA modules 1208, 1224, rotation detector modules 1210, 1226, and a speed/direction module 1212 can be the same as and coupled the same way as AGC/AOA modules 160, 166, the rotation detector modules 162, 168, and the speed/direction module 164 of FIG. 2.

Two-state signals 1210a 1226a have +/−ninety degree phase relationships described above in conjunction with FIG. 10.

The electronic circuit 1200, due to the differencing of signals, can provide a so-called "edge detector" that can sense an edge of a gear tooth as it passes by.

Figure 13:
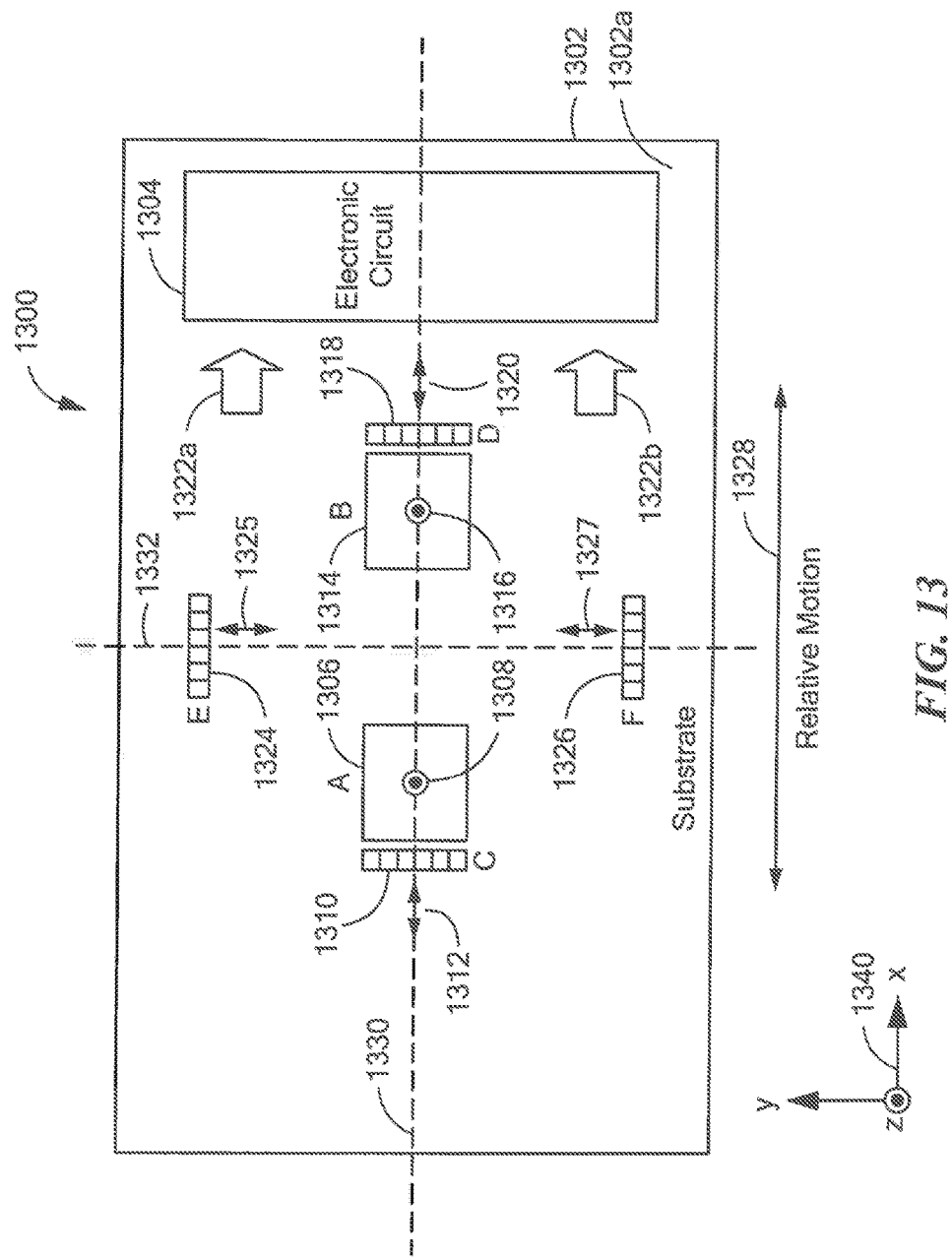
FIG. 13 is a block diagram showing a top view of an illustrative substrate portion of a magnetic field sensor according to FIG. 4 and having six magnetic field sensing elements and an electronic circuit.

Referring now to FIG. 13, a substrate portion of a magnetic field sensor 1300 can include a substrate 1302 the same as or similar to the substrate 402 of FIG. 4. The substrate 1302 can be disposed substantially parallel to the same x-y plane of coordinate axes 1340 as indicated by the coordinate axes 420 of FIG. 4

A surface 1302a of the substrate 1302 can be the same as or similar to the surface 402a of the substrate 402 of FIG. 4.

An electronic circuit 1304 can be disposed in or upon the surface 1302a of the substrate 1302. The electronic circuit 1304 can be the same as or similar to the electronic circuit 406 of FIG. 4.

A first magnetic field sensing element 1306, a second magnetic field sensing element 1310, a third magnetic field sensing element 1314, a fourth magnetic field sensing element 1318, a fifth magnetic field sensing element 1326, and a sixth magnetic field sensing element 1326 can be the same as or similar to magnetic field sensing elements in the magnetic field sensing element region 404 of FIG. 4

A ferromagnetic object (not shown) can move with a direction substantially parallel to a line 1328, which can be, for example, representative of a line substantially parallel to the tangent line 440 of FIG. 4. The ferromagnetic object can move directly over the substrate point at which the orthogonal axes 1330, 1332 intersect.

The first magnetic field sensing element 1306 and the third magnetic field sensing element 1314 can be planar Hall effect elements 1306, 1314 (also sometimes referred to as horizontal Hall effect elements). As described above, the planar Hall effect element 1306 and has an axis of maximum sensitivity 1308 and the planar Hall effect element 1314 has an axis of maximum sensitivity 1316, both substantially parallel to a z-axis of coordinate axes 1340. The axes of maximum sensitivity 1308, 1316 are substantially perpendicular to the surface 1302a of the substrate 1302.

In contrast, the second magnetic field sensing element 1310 and the fourth magnetic field sensing element 1318 can be a vertical Hall effect elements 1310, 1318. As described above, the vertical Hall effect elements 1310, 1318 have respective axes of maximum sensitivity 1312, 1320 substantially parallel to the x-axis of the coordinate axes 1340, i.e., substantially parallel to the surface 1302a of the substrate. The maximum response axes 1308, 1316 can be substantially perpendicular to the maximum response axes 1312, 1318.

The fifth magnetic field sensing element 1324 and the sixth magnetic field sensing element 1326 can also be vertical Hall effect elements 1324, 1326. Unlike the vertical Hall effect elements 1310, 1318, the vertical Hall effect elements 1324, 1326 have respective axes of maximum sensitivity 1325, 1327 substantially parallel to the y-axis of the coordinate axes 1340, i.e., substantially parallel to the surface 1302a of the substrate. The maximum response axes 1325, 1327 can be substantially perpendicular to the maximum response axes 1312, 1320 and substantially perpendicular to the maximum response axes 1308, 1316.

Electronic signals 1322a, 1322b, described more fully below, couple the first, second, third, fourth, fifth, and sixth fourth magnetic field sensing elements 1306, 1310, 1314, 1318, 1324, 1326, respectively, to the electronic circuit 1304.

A magnet (not shown) can be disposed under the substrate 1302 and can have the same orientation and characteristics described below in conjunction with the magnet 408 of FIG. 4.

First and second orthogonal axes 1330, 1332, respectively, substantially parallel to the first surface 1302a of the substrate 1302, are indicative of examples of relative placements of the first, second, third, fourth, fifth, and sixth magnetic field sensing elements 1306, 1310, 1314, 1318, 1324, 1326, respectively, and also indicative of an example of a relative position of the magnet 408 of FIG. 4. The axis 424 of the magnet can intersect in a z direction (see coordinate axes 1340) at an intersection of the first and second orthogonal axes 1330, 1332, the intersection also referred to herein as a "substrate point." The first, second, third, fourth, fifth and sixth magnetic field sensing elements 1308, 1310, 1314, 1318, 1324, 1326, respectively, can be disposed along the first or second orthogonal axes 1330, 1332 and can also be disposed apart from the substrate point.

Centers of the first and third magnetic field sensing elements 1306, 1314, respectively, can be disposed along the first orthogonal axis 1330. In some embodiments, a midpoint between centers of the first and third magnetic field sensing elements 1306, 1314, respectively, can be disposed at the intersection of the first and second coordinate axes 1330, 1332.

Centers of the second and fourth magnetic field sensing elements 1310, 1318, respectively, can be disposed along the first or second orthogonal axis 1330, 1332, here shown to be along the first orthogonal axis 1330. In some embodiments, a midpoint between centers of the second and fourth magnetic field sensing elements 1310, 1318, respectively, can be disposed at the intersection of the first and second coordinate axes 1330, 1332. However, other placements of the second and fourth magnetic field sensing elements 1310, 1318 are also possible.

Centers of fifth and sixth magnetic field sensing elements 1324, 1326, respectively, can be disposed along the first or second orthogonal axis 1330, 1332, here shown to be along the second orthogonal axis 1332. In some embodiments, a midpoint between centers of the fifth and sixth magnetic field sensing elements 1324, 1326, respectively, can be disposed at the intersection of the first and second coordinate axes 1330, 1332. However, other placements of the fifth and sixth magnetic field sensing elements 1324, 1326 are also possible.

In response to movement of a ferromagnetic object in a direction parallel to an arrow 1328, the fifth and sixth magnetic field sensing elements 1324, 1326 have less response (less change in signal value) than the second and fourth magnetic field sensing elements 1310, 1318. Thus, signals from the fifth and sixth magnetic field sensing elements 1324, 1326, when combined in particular ways with signals from the second and fourth magnetic field sensing elements 1310, 1318, can act as reference signals to reduce various undesirable effects, for example, DC drift with temperature. This arrangement of signal combinations is described below in conjunction with FIG. 14.

Figure 14:
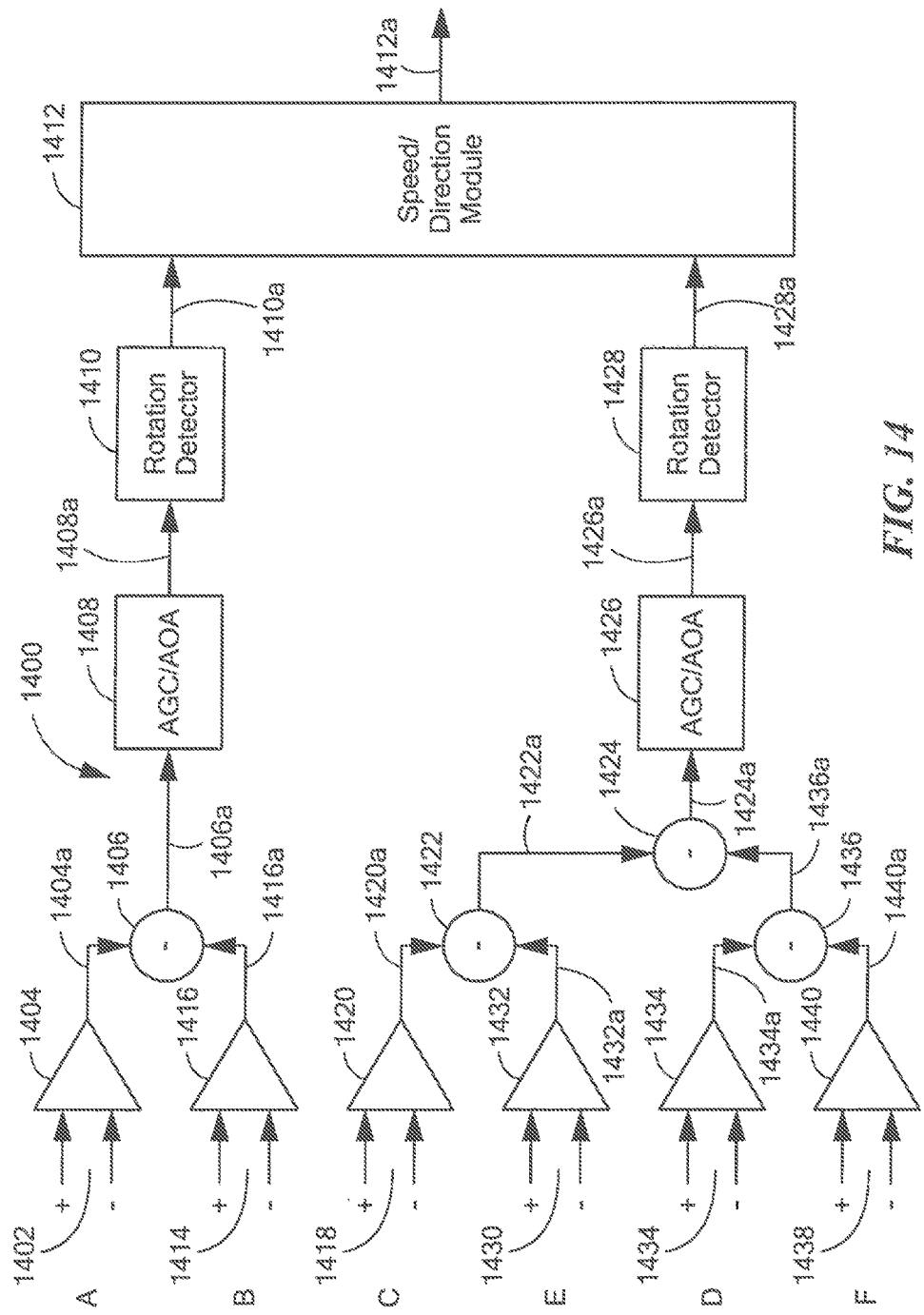
FIG. 14 is a block diagram showing further details of an example of the electronic circuit of FIG. 13.

Referring now to FIG. 14, an electronic circuit 1400 can be the same as or similar to the electronic circuit 406 of FIG. 4 when the magnetic field sensor 400 of FIG. 4 includes the substrate portion 1300 of FIG. 13, having six magnetic field sensing element 1306, 1310, 1314, 1318, 1324, 1326. The first magnetic field sensing element 1306 of FIG. 13 provides a differential signal 1402. The third magnetic field sensing element 1314 of FIG. 13 provides a differential signal 1414. The second magnetic field sensing element 1310 of FIG. 13 provides a differential signal 1418. The fifth magnetic field sensing element 1324 of FIG. 13 provides a differential signal 1430. The fourth magnetic field sensing element 1318 of FIG. 13 provides a differential signal 1434. The sixth magnetic field sensing element 1326 of FIG. 13 provides a differential signal 1438.

Amplifiers 1404, 1416, are coupled to receive the differential signals 1402, 1414, respectively, and operable to generate amplified signals 1404a, 1416a. A differencing module 1406 can be coupled to receive the amplified signals 1404a, 1416a and operable to generate a first difference signal 1406a.

Amplifiers 1420, 1432, are coupled to receive the differential signals 1418, 1430, respectively, and operable to generate amplified signals 1420a, 1432a. A differencing module 1422 can be coupled to receive the amplified signals 1420a, 1432a and operable to generate a second difference signal 1422a.

Amplifiers 1434, 1440, are coupled to receive the differential signals 1434, 1438 respectively, and operable to generate amplified signals 1434a, 1440a. A differencing module 1436 can be coupled to receive the amplified signals 1434a, 1440a and operable to generate a third difference signal 1436a.

Another differencing module 1424 can be coupled to receive the first and second difference signals 1422a, 1436a, respectively and operable to generate a fourth difference signal 1424a.

In accordance with the discussion above in conjunction with FIGS. 9 and 10, the difference signals 1406a, 1424a have a ninety degree phase relationship when the gear 422 of FIG. 4 rotates, for all rotational speeds of the gear 422.

AOA/AGC modules 1408, 1426 are coupled to receive the first and third difference signals 1406a, 1424a, respectively. The AGC/AOA modules 1408, 1426, rotation detector modules 1410, 1428, and a speed/direction module 1412 can be the same as and coupled the same way as AGC/AOA modules 160, 166, the rotation detector modules 162, 168, and the speed/direction module 164 of FIG. 2.

Two-state signals 1410a, 1428a have +/−ninety degree phase relationships described below in conjunction with FIG. 10.

The difference module 1422 operates to combine the amplified signal 1420a from the second magnetic field sensing element 1310 with the amplified signal 1432a from the fifth magnetic field sensing element 1324. As described above in conjunction with FIG. 13, the fifth magnetic field sensing element 1324 is relatively insensitive to a ferromagnetic object that moves in the direction of the line 1328 of FIG. 13. Thus, the differential arrangement provided by the difference module 1422 can result in a stabilization of the resulting difference signal 1422a against a variety of undesirable effects. For example, upon a temperature change, both the amplified signal 1420a and the amplified signal 1432a may experience a similar change of DC offset voltage, which would be reduced in the difference signal 1422a since the amplified signal 1420a and the amplified signal 1432a would tend to move in the same direction and by the same amount.

For substantially the same reason with substantially the same beneficial effects, the difference module 1436 operates to combine the amplified signal 1434a from the fourth magnetic field sensing element 1318 with the amplified signal 1440a from the sixth magnetic field sensing element 1326.

The electronic circuit 1400, due to the differencing of signals, can provide a so-called "edge detector" that can sense an edge of a gear tooth as it passes by.

Figure 15:
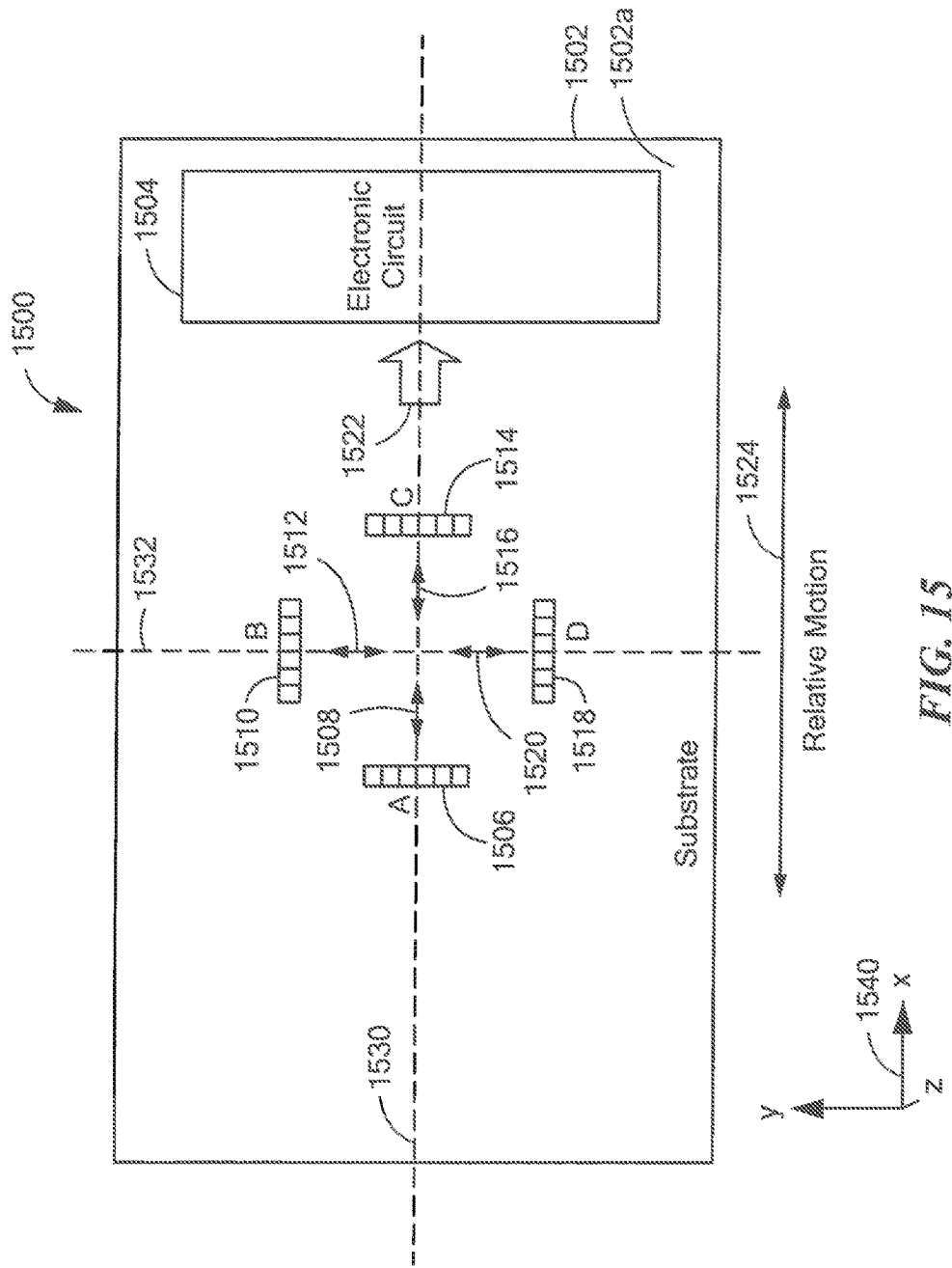
FIG. 15 is a block diagram showing a top view of an illustrative substrate portion of a magnetic field sensor according to FIG. 4 and having four magnetic field sensing elements and an electronic circuit.

Referring now to FIG. 15, a substrate portion of a magnetic field sensor 1500 can include a substrate 1502 the same as or similar to the substrate 402 of FIG. 4. The substrate 1502 can be disposed substantially parallel to the same x-y plane of coordinate axes 1540 as indicated by the coordinate axes 420 of FIG. 4

A surface 1502a of the substrate 1502 can be the same as or similar to the surface 402a of the substrate 402 of FIG. 4.

An electronic circuit 1504 can be disposed in or upon the surface 1502a of the substrate 1502. The electronic circuit 1504 can be the same as or similar to the electronic circuit 406 of FIG. 4.

A first magnetic field sensing element 1506, a second magnetic field sensing element 1510, a third magnetic field sensing element 1514, and a fourth magnetic field sensing element 1518, can be the same as or similar to magnetic field sensing elements in the magnetic field sensing element region 404 of FIG. 4

A ferromagnetic object (not shown) can move with a direction substantially parallel to a line 1524, which can be, for example, representative of a line substantially parallel to the tangent line 440 of FIG. 4. The ferromagnetic object can move directly over the substrate point at which the orthogonal axes 1530, 1532 intersect.

The first, second, third, and fourth magnetic field sensing elements 1506, 1510, 1514, 1518, respectively, can be vertical Hall effect elements 1506, 1510, 1514, 1518.

The first and third magnetic field sensing elements 1506, 1514 have respective axes of maximum sensitivity 1508, 1520 substantially parallel to the x-axis of coordinate axes 1540 and also substantially parallel to the surface 1502a of the substrate 1502. The second and fourth magnetic field sensing elements 1510, 1518 have respective axes of maximum sensitivity 1512, 1520 substantially parallel to the y-axis of the coordinate axes 1540, and also substantially parallel to the surface 1502a of the substrate 1502. The maximum response axes 1508, 1516 can be substantially perpendicular to the maximum response axes 1512, 1518.

Electronic signals 1522 described more fully below, couple the first, second, third, and fourth magnetic field sensing elements 1506, 1510, 1514, 1518, respectively, to the electronic circuit 1504.

A magnet (not shown) can be disposed under the substrate 1502 and can have the same orientation and characteristics described below in conjunction with the magnet 408 of FIG. 4.

First and second orthogonal axes 1530, 1532, respectively, substantially parallel to the first surface 1502a of the substrate 1502, are indicative of examples of relative placements of the first, second, third, and fourth magnetic field sensing elements 1506, 1510, 1514, 1518, respectively, and also indicative of an example of a relative position of the magnet 408 of FIG. 4. The axis 424 of the magnet can intersect in a z direction (see coordinate axes 1540) at an intersection of the first and second orthogonal axes 1530, 1532, the intersection also referred to herein as a "substrate point." The first, second, third, and fourth magnetic field sensing elements 1506, 1514, 1510, 1518, respectively, can be disposed along the first or second orthogonal axes 1530, 1532 and can also be disposed apart from the substrate point.

Centers of the first and third magnetic field sensing elements 1506, 1514, respectively, can be disposed along the first orthogonal axis 1530. In some embodiments, a midpoint between centers of the first and third magnetic field sensing elements 1506, 1514, respectively, can be disposed at the intersection of the first and second coordinate axes 1530, 1532.

Centers of the second and fourth magnetic field sensing elements 1510, 1518, respectively, can be disposed along the first or second orthogonal axis 1530, 1532, here shown to be along the second orthogonal axis 1532. In some embodiments, a midpoint between centers of the second and fourth magnetic field sensing elements 1510, 1518, respectively, can be disposed at the intersection of the first and second coordinate axes 1530, 1532. However, other placements of the second and fourth magnetic field sensing elements 1510, 1518 are also possible.

In response to movement of a ferromagnetic object in a direction parallel to an arrow 1524, the second and fourth magnetic field sensing elements 1510, 1518 have less response (less change in signal value) than the first and third magnetic field sensing elements 1506, 1514. Thus, signals from the second and fourth magnetic field sensing elements 1510, 1518, when combined in particular ways with signals from the first and third magnetic field sensing elements 1506, 1514, respectively, can act as reference signals to reduce various undesirable effects, for example, DC drift with temperature. This arrangement of signal combinations is described below in conjunction with FIG. 16.

Figure 16:
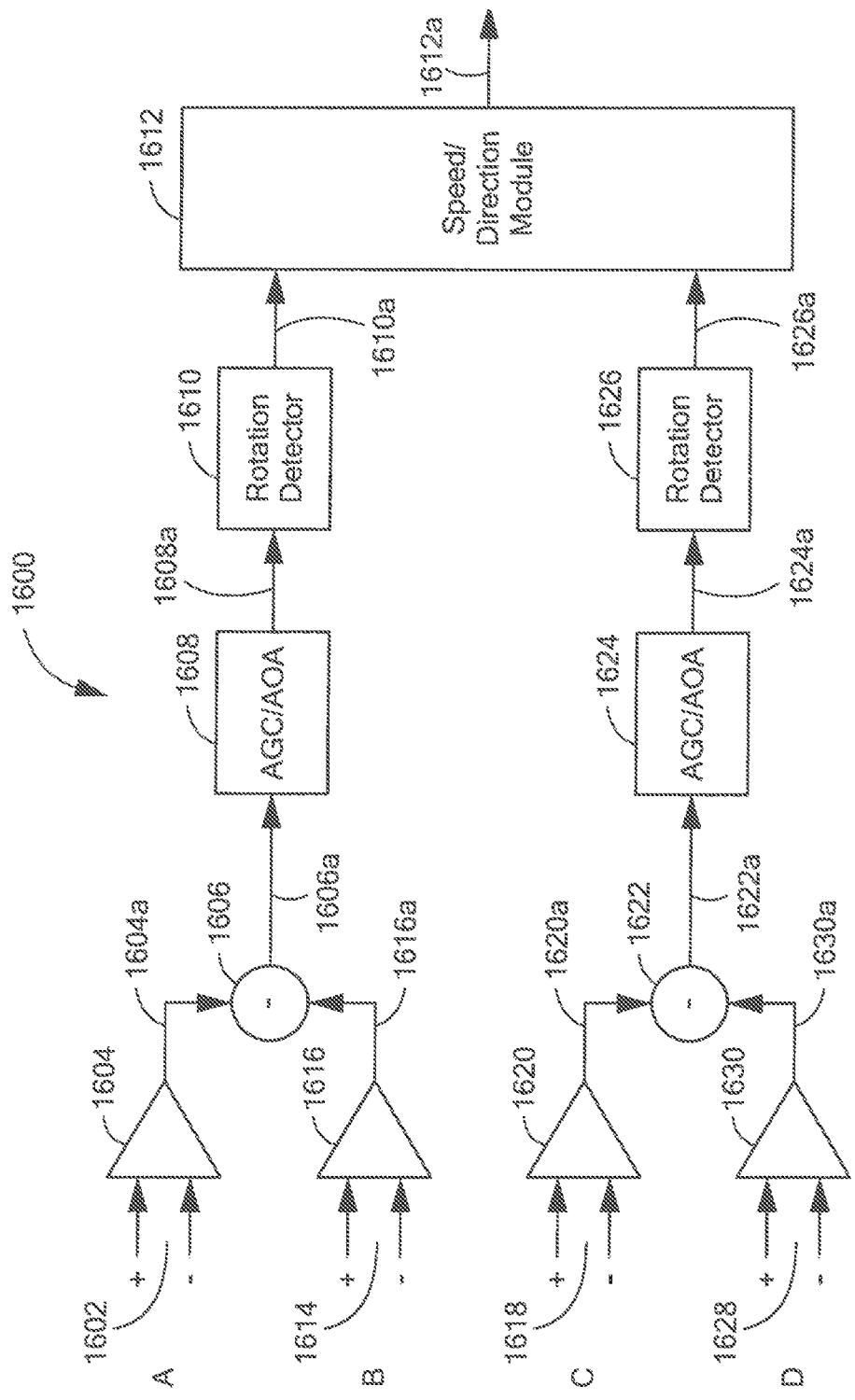
FIG. 16 is a block diagram showing further details of an example of the electronic circuit of FIG. 15.

Referring now to FIG. 16, an electronic circuit 1600 can be the same as the electronic circuit 406 of FIG. 4 when the magnetic field sensor 400 of FIG. 4 includes the magnetic field sensor 1500 of FIG. 15, having the four magnetic field sensing element 1506, 1510, 1514, 1518. The first magnetic field sensing element 1506 of FIG. 15 provides a differential signal 1602. The second magnetic field sensing element 1510 of FIG. 15 provides a differential signal 1614. The third magnetic field sensing element 1514 of FIG. 15 provides a differential signal 1618. The fourth magnetic field sensing element 1518 of FIG. 15 provides a differential signal 1628.

Amplifiers 1604, 1616, are coupled to receive the differential signals 1602, 1614, respectively, and operable to generate amplified signals 1604a, 1616a. A differencing module 1606 can be coupled to receive the amplified signals 1604a, 1616a and operable to generate a first difference signal 1606a.

Amplifiers 1620, 1630, are coupled to receive the differential signals 1618, 1628, respectively, and operable to generate amplified signals 1620a, 1630a. A differencing module 1622 can be coupled to receive the amplified signals 1620a, 1630a and operable to generate a second difference signal 1622a.

In accordance with the discussion above in conjunction with FIGS. 2 and 3, the difference signals 1606a, 1622a have a relatively close (i.e., small) phase relationship when the gear 422 of FIG. 4 rotates, for all rotational speeds of the gear 422. Thus, advantages of the arrangements of FIGS. 4-14 that provide a ninety degree relationship may not be in the arrangements of FIGS. 15 and 16. However, other advantages described above in relation to FIGS. 13 and 14 are retained in the arrangements of FIGS. 15 and 16. Namely, the second and fourth magnetic field sensing elements 1510, 1518 of FIG. 15 provide reference voltages to stabilize for a variety of otherwise undesirable effects, e.g., shifting DC offset voltage with temperature.

AOA/AGC modules 1608, 1624 are coupled to receive the first and third difference signals 1606a, 1622a, respectively. The AGC/AOA modules 1608, 1624, rotation detector modules 1610, 1626, and a speed/direction module 1612 can be the same as and coupled the same way as AGC/AOA modules 160, 166, the rotation detector modules 162, 168, and the speed/direction module 164 of FIG. 2.

Two-state signals 1610a, 1626a have a phase relationships described below in conjunction with FIG. 3.

The difference module 1606 operates to combine the amplified signal 1604a from the first magnetic field sensing element 1505 with the amplified signal 1616a from the second magnetic field sensing element 1510. As described above in conjunction with FIG. 13, the second magnetic field sensing element 1510 is relatively insensitive to a ferromagnetic object that moves in the direction of the line 1524 of FIG. 15. Thus, the differential arrangement provided by the difference module 1606 can result in a stabilization of the resulting difference signal 1606a against a variety of undesirable effects. For example, upon a temperature change, both the amplified signal 1604a and the amplified signal 1616a may experience s similar change of DC offset voltage, which would be reduced in the difference signal 1606a since the amplified signal 1604a and the amplified signal 1616a would tend to move in the same direction and by the same amount.

For substantially the same reason with substantially the same beneficial effects, the difference module 1622 operates to combine the amplified signal 1620a from the third magnetic field sensing element 1514 with the amplified signal 1630a from the fourth magnetic field sensing element 1518.

The electronic circuit 1600, can provide a so-called "tooth detector" that can sense a presence or absence of proximity of a gear tooth (also valley), even when the gear 422 of FIG. 4 is not rotating.

While many of the magnetic field sensing elements are described above to be vertical Hall effect elements, in other embodiments, one or more of the vertical Hall effect elements can be magnetoresistance elements. As described above, like vertical Hall effect elements, magnetoresistance elements have a maximum response axis that is substantially parallel to a substrate. Thus, all of the above configurations apply to magnetoresistance elements.

Figure 17:
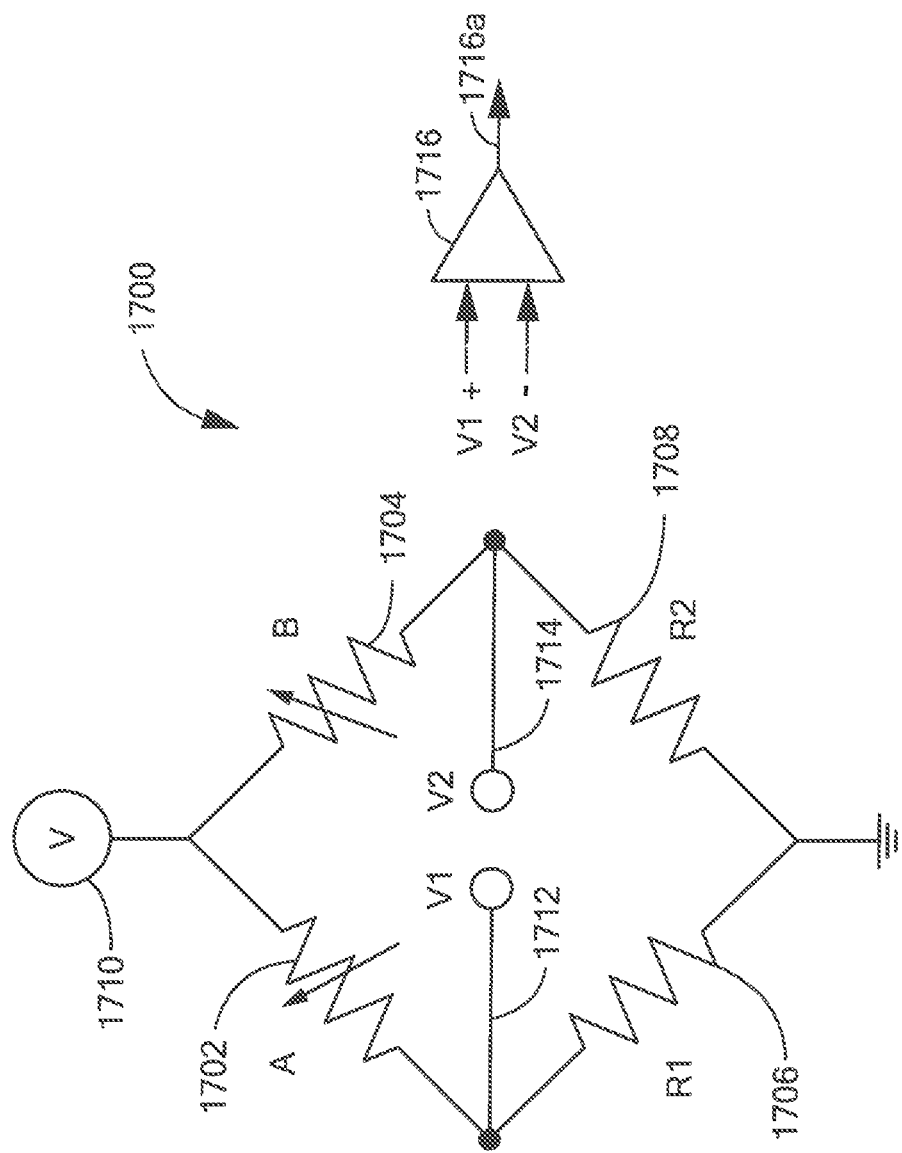
FIG. 17 is a block diagram showing two magnetoresistance elements coupled in a bridge arrangement that can be used in the magnetic field sensors and electronic circuits of FIGS. 4-9, and 11-16.

Referring now to FIG. 17, a magnetoresistance element bridge 1700 can be used in place of some of the difference modules described above.

The magnetoresistance element bridge 1700 can include a first magnetoresistance element 1702, a second magnetoresistance element 1704, a first fixed resistor 1706, and a second fixed resistor 1708, all coupled in a bridge arrangement between a voltage source 1710 and a reference voltage, e.g., a ground reference voltage.

A differential signal 1712, 1714 is generated by the magnetoresistance element bridge 1700.

In some embodiments, a buffer amplifier 1716 can be coupled to receive the differential signal 1712, 1714 and operable to generate a buffered signal 1716a.

It should be apparent that the differential signal 1712, 1714 operate in much the same way as a difference of signals from two magnetoresistance elements. Compare the magnetoresistance element bridge 1700, for example, with the difference module 1606 or the difference module 1622 of FIG. 16. In FIG. 17, if both of the magnetoresistance elements 1702, 1704 move in the same way by the same amount, then the differential voltage 1712, 1714 is unchanged. The buffer 1716 can provide enhanced common mode rejection.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A magnetic field sensor for sensing a movement of an object operable to move along one and only one path, wherein a movement line is tangent to the one and only one path, such that the movement line passes through two infinitely close points on the one and only one path, the magnetic field sensor comprising:

a magnet, the magnet comprising a magnet surface, a north pole, a south pole, and a magnet axis passing through the north pole and the south pole;

a semiconductor substrate proximate to the magnet and at a position between the object and the magnet surface, the semiconductor substrate having first and second surfaces opposing each other, the magnet axis substantially perpendicular to the first surface of the semiconductor substrate, the semiconductor substrate having first and second orthogonal axes orthogonal to each other on the first surface of the substrate intersecting at a substrate point on the first surface of the substrate, wherein the magnet axis intersects the substrate point, wherein, for any movement line tangent to the one and only one path, a projection of the any movement line tangent to the one and only one path onto the first surface of the semiconductor substrate is substantially parallel to the first orthogonal axis on the first surface of the substrate;

a first magnetic field sensing element disposed on or under the first surface of the semiconductor substrate, wherein the first magnetic field sensing element comprises an axis of maximum sensitivity substantially parallel to the first surface of the substrate and substantially parallel to the first orthogonal axis;

a second magnetic field sensing element disposed on or under the first surface of the semiconductor substrate, wherein the second magnetic field sensing element comprises an axis of maximum sensitivity substantially parallel to the first surface of the substrate and substantially parallel to the second orthogonal axis, wherein, for any movement of the object, the second magnetic field sensing element is substantially less responsive to the movement than is the first magnetic field sensing element;

a third magnetic field sensing element disposed on or under the first surface of the semiconductor substrate, wherein the third magnetic field sensing element comprises an axis of maximum sensitivity substantially parallel to the first surface of the substrate and substantially parallel to the first orthogonal axis; and a fourth magnetic field sensing element disposed on or under the first surface of the semiconductor substrate, wherein the fourth magnetic field sensing element comprising an axis of maximum sensitivity substantially parallel to the first surface of the substrate and substantially parallel to the second orthogonal axis, wherein, for any movement of the object, the fourth magnetic field sensing element is substantially less responsive to the movement than is the third magnetic field sensing element.

2. The magnetic field sensor of claim 1, wherein the first, second, third, and fourth magnetic field sensing elements comprise vertical Hall effect elements.

3. The magnetic field sensor of claim 1, wherein the first, second, third, and fourth magnetic field sensing elements comprise magnetoresistance elements.

4. The magnetic field sensor of claim 1, wherein centers of the first and third magnetic field sensing elements are disposed along the first orthogonal axis and equidistant from the substrate point.

5. The magnetic field sensor of claim 4, wherein the centers of second and fourth magnetic field sensing elements are disposed along the second orthogonal axis and equidistant from the substrate point.

6. The magnetic field sensor of claim 1, further comprising:
a first electronic circuit channel coupled to receive a first signal generated by the first magnetic field sensing element and coupled to receive a second signal generated by the second magnetic field sensing element, the first electronic circuit channel operable to generate a first difference signal as a difference of the first and second signals, the first electronic circuit channel operable to generate the first difference signal having a first phase; and
a second electronic circuit channel coupled to receive a third signal generated by the third magnetic field sensing element and coupled to receive a fourth signal generated by the fourth magnetic field sensing element, the second electronic circuit channel operable to generate a second difference signal as a difference of the third and fourth signals, the second electronic circuit channel operable to generate the second difference signal having a second phase different from the first phase, wherein a sign of a phase difference between the first phase and the second phase is indicative of a direction of the movement of the object.

7. The magnetic field sensor of claim 1, further comprising:
a first electronic circuit channel coupled to receive a first signal generated by the first magnetic field sensing element and coupled to receive a second signal generated by the second magnetic field sensing element, the first electronic circuit channel operable to generate a first difference signal as a difference of the first and second signals, wherein the second signal generated by the second magnetic field sensing element operates as a first reference signal being less responsive to the magnetic field for any movement of the object than the first signal but having the same DC response to temperature as the first signal such that the first difference signal has a reduced DC voltage drift with temperature; and
a second electronic circuit channel coupled to receive a third signal generated by the third magnetic field sensing element and coupled to receive a fourth signal generated by the fourth magnetic field sensing element, the second electronic circuit channel operable to generate a second difference signal as a difference of the third and fourth signals, wherein the fourth signal generated by the fourth magnetic field sensing element operates as a second reference signal being less responsive to the magnetic field for any movement of the object than the third signal but having the same DC response to temperature as the third signal such that the second difference signal has a reduced DC voltage drift with temperature.

8. The magnetic field sensor of claim 1, wherein the first, second, third, and fourth magnetic field sensing elements are disposed away from the substrate point.

9. The magnetic field sensor of claim 1, wherein the object comprises a ferromagnetic object and has no permanent magnetism.

10. The magnetic field sensor of claim 9, wherein the magnet forms a back-biased arrangement with the first, second, third, and fourth magnetic field sensing elements such that the movement of the object results in respective changes of angles of the magnetic field generated by the magnet at the first, second, third, and fourth magnetic field sensing elements.

11. The magnetic field sensor of claim 9, wherein the ferromagnetic object comprises a gear tooth on a gear operable to rotate about a gear axis substantially perpendicular to any movement line tangent to the one and only one path.

* * * * *

UNITED STATES PATENT AND TRADEMARK OFFICE
CERTIFICATE OF CORRECTION

PATENT NO. : 10,260,905 B2  
APPLICATION NO. : 15/176655  
DATED : April 16, 2019  
INVENTOR(S) : Paul A. David et al.

Page 1 of 1

It is certified that error appears in the above-identified patent and that said Letters Patent is hereby corrected as shown below:

In the Specification

Column 2, Line 7, delete "inventions provides" and replace with --invention provides--.

Column 9, Line 61, delete "FIG. 4" and replace with --FIG. 4.--.

Column 10, Line 4, delete "FIG. 4" and replace with --FIG. 4.--.

Column 10, Line 59, delete "FIG. 4" and replace with --FIG. 4.--.

Column 11, Line 4, delete "FIG. 4" and replace with --FIG. 4.--.

Column 11, Line 33, delete "circuit 604" and replace with --circuit 604.--.

Column 14, Line 54, delete "FIG. 4" and replace with --FIG. 4.--.

Column 15, Line 18, delete "FIG. 4" and replace with --FIG. 4.--.

Column 16, Line 26, delete "FIG. 4" and replace with --FIG. 4.--.

Column 19, Line 21, delete "FIG. 4" and replace with --FIG. 4.--.

Column 19, Line 33, delete "FIG. 4" and replace with --FIG. 4.--.

Signed and Sealed this  
Eighteenth Day of February, 2020

Andrei Iancu  
*Director of the United States Patent and Trademark Office*